(12) United States Patent
Lane et al.

(10) Patent No.: US 11,825,326 B2
(45) Date of Patent: *Nov. 21, 2023

(54) BEAM MANAGEMENT METHODS AND APPARATUS

(71) Applicant: Mixcomm, Inc., Chatham, NJ (US)

(72) Inventors: Frank Lane, Easton, PA (US); Harish Krishnaswamy, New York, NY (US); Ashwin Sampath, Skillman, NJ (US)

(73) Assignee: Mixcomm, Inc., Chatham, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,897

(22) Filed: May 18, 2021

(65) Prior Publication Data

US 2021/0274371 A1 Sep. 2, 2021

Related U.S. Application Data

(63) Continuation of application No. 16/286,451, filed on Feb. 26, 2019, now Pat. No. 11,012,881.

(60) Provisional application No. 62/734,854, filed on Sep. 21, 2018, provisional application No. 62/694,952, filed on Jul. 6, 2018.

(51) Int. Cl.
*H04W 24/10* (2009.01)
*H04B 7/06* (2006.01)

(52) U.S. Cl.
CPC .......... *H04W 24/10* (2013.01); *H04B 7/0695* (2013.01)

(58) Field of Classification Search
CPC ..... H04W 16/28; H04W 88/08; H04W 24/10; H04W 72/046; H04W 72/085
See application file for complete search history.

(56) References Cited

U.S. PATENT DOCUMENTS

| 2017/0150487 | A1 | 5/2017 | Zhou et al. |
| 2017/0207845 | A1* | 7/2017 | Moon ............ H04B 7/088 |
| 2017/0347276 | A1 | 11/2017 | Yu et al. |
| 2019/0349049 | A1* | 11/2019 | Li ................. H04W 56/001 |

(Continued)

OTHER PUBLICATIONS

Extended European Search Report for European Patent Application No. 19831075.7, 10 pages, dated Mar. 14, 2022.

*Primary Examiner* — Khaled M Kassim
*Assistant Examiner* — Najeeb Ansari
(74) *Attorney, Agent, or Firm* — Straub & Straub; Michael P. Straub; Stephen T. Straub

(57) ABSTRACT

Methods and apparatus for selecting a beam mode and/or beam for communicating with one or more devices are described. The beam mode selection may be and sometimes is between a broad beam mode of operation and a narrow beam mode of operation with respect to a particular device. Communication with one or more device may happen at a given time with the preferred beam mode and/or choice for an individual device sometimes being replaced with a beam mode and/or beam choice which is preferable from an overall system perspective, e.g., because it allows data transmission and/QoS requirements to multiple devices to be supported better than would be achieved if the preferred beam mode and/or beam selection made with respect to an individual device was used. The beam mode and/or beam selected for traffic data communication sometimes is different from the beam mode and/or beam used for communicating control channel information.

18 Claims, 21 Drawing Sheets

(56) References Cited

U.S. PATENT DOCUMENTS

2021/0175953 A1\* 6/2021 Nilsson ................ H04B 7/0695
2021/0185547 A1\* 6/2021 Zhao ..................... H04W 16/28

\* cited by examiner

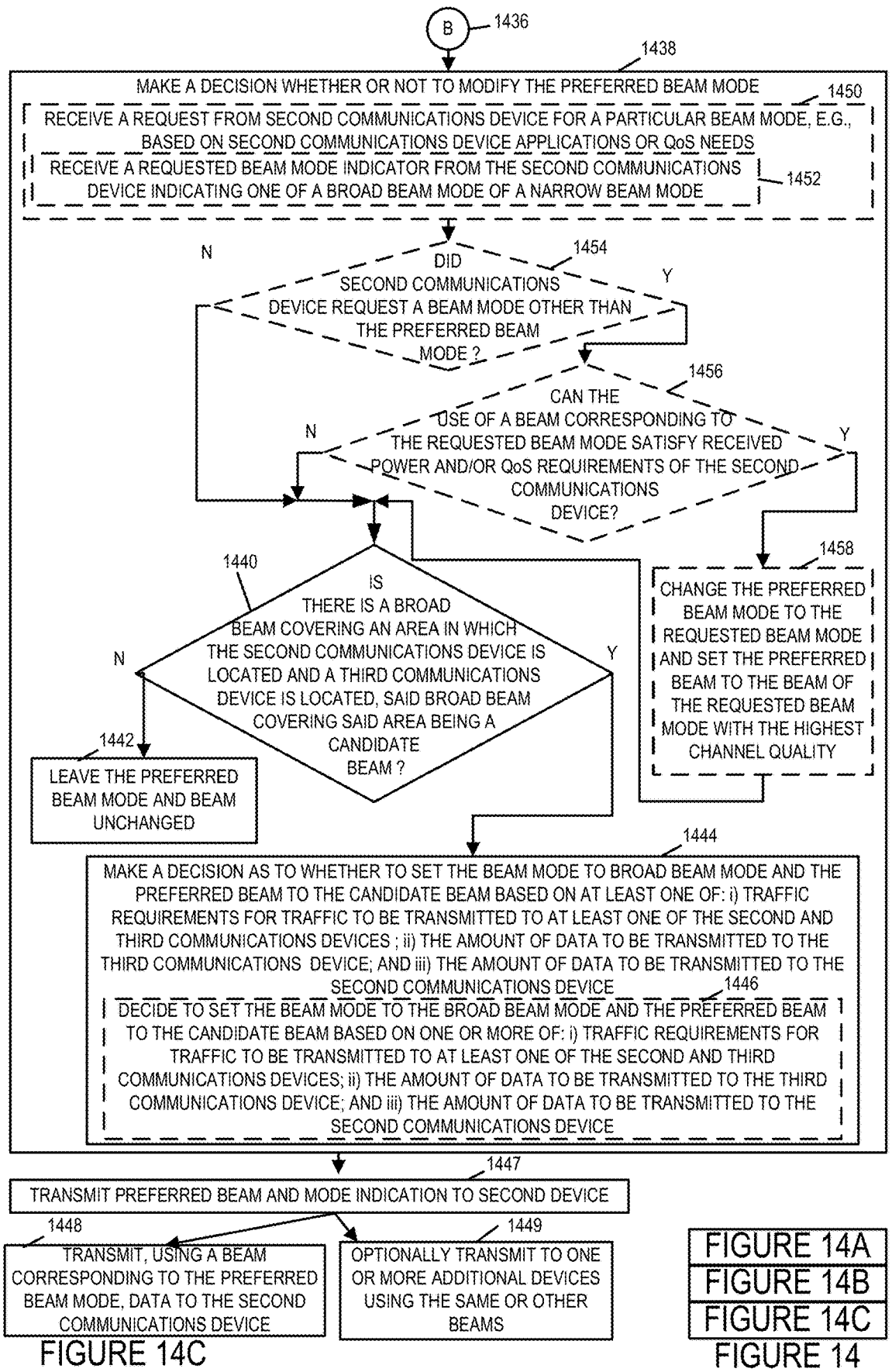

| FIGURE 15A | FIGURE 15B | FIGURE 15C |

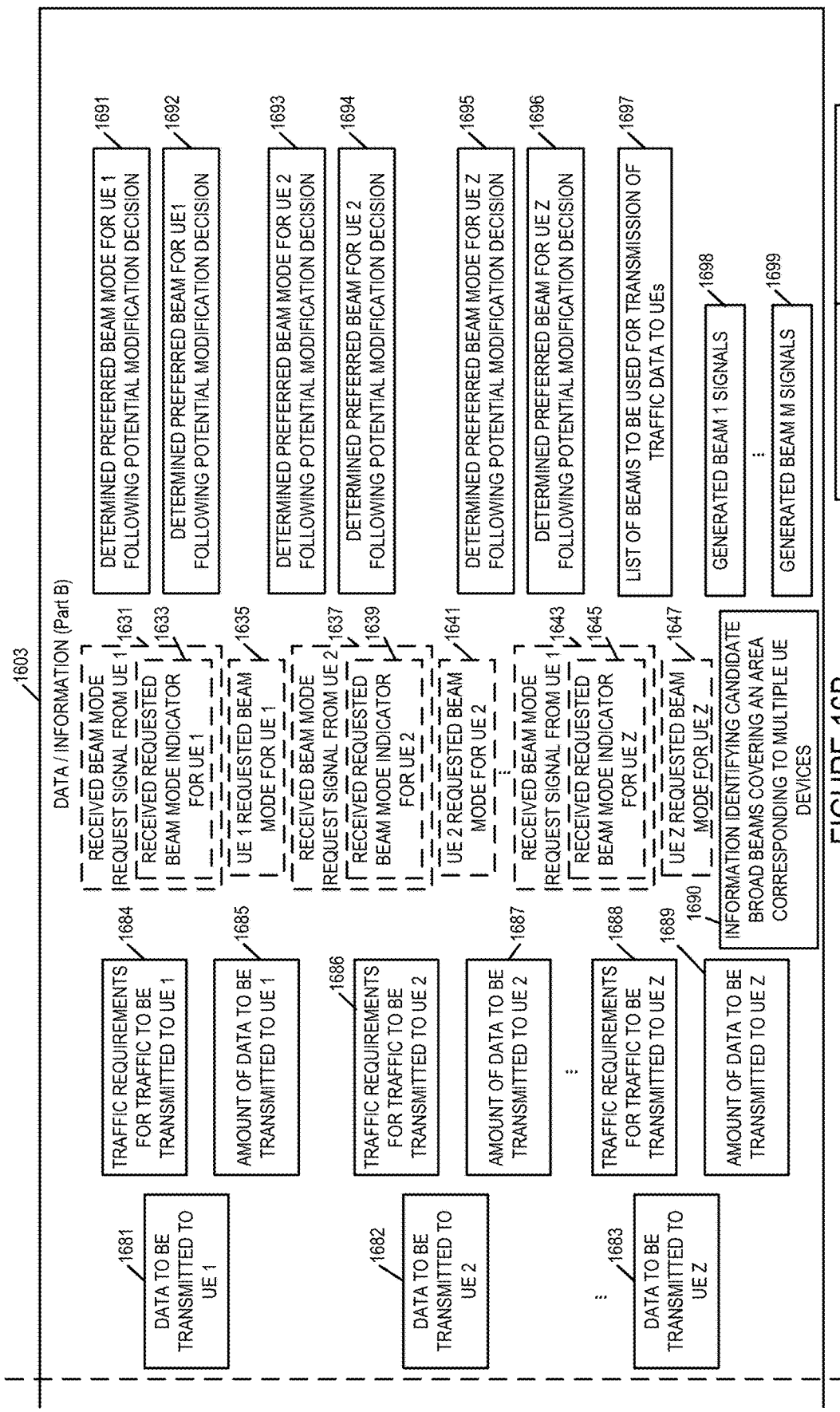

BEAM MANAGEMENT METHODS AND APPARATUS

RELATED APPLICATIONS

The present application is a continuation of U.S. patent application Ser. No. 16/286,451 filed on Feb. 26, 2019, which claims the benefit of the filing date of U.S. Provisional patent application Ser. No. 62/694,952 which was filed Jul. 6, 2018 and U.S. Provisional patent application Ser. No. 62/734,854 filed Sep. 21, 2018 each of which are hereby incorporated by reference in their entirety.

FIELD

The present invention relates to wireless communications methods and apparatus, and more particularly to beam management methods and apparatus in a wireless communications system supporting narrow and broad beams.

BACKGROUND

Millimeter wavelength communications systems are beginning to be developed and likely to see commercial deployment in the near future. In fact, what are sometimes described as fifth generation (5G) wireless communication systems are now being developed for use in the millimeter wave (mmWave) frequency bands.

The millimeter wave spectrum at 20 GHz-300 GHz is of increasing interest to service providers and systems designers because of the wide bandwidths available for carrying communications at this frequency range. Such wide bandwidths are valuable in supporting applications such as high speed data transmission and video distribution. While signals at lower frequency bands can propagate for many miles and penetrate more easily through buildings, millimeter wave signals can usually travel only a few miles or less and do not penetrate solid materials very well.

The propagation characteristics of millimeter wavelength communications can result in signal quality changing rather quickly as an UE (user equipment) device moves relative to an access point, e.g., base station, and/or an object moves between the space between a UE and access point.

The use of array antennas is sometimes suggested for use with millimeter wavelength systems. The use of an antenna array with multiple antenna elements allows for beam forming and/or beam steering techniques to be used. The use of a narrow beam for communication of data to/from a UE is often considered desirable because the use of a narrow beam often allows for greater range and concentration of signal energy allowing for high data rates to be supported. Furthermore, such narrow beams are desirable as they typically cause less interference in the system, compared to when the same radiated power is sent in all directions. In contrast to data channels, where large amounts of user data often need to be transmitted, control channels are often used for relatively little data, but may need to be sent with high reliability.

The use of broad beams is sometimes suggested for use with control channels. The use of a broad beam for communicating control information decreases the risk that a UE will not remain in the coverage area of the beam communicating the control information during transmission or reception of control information to an access point. Given that relatively little data is transmitted on control channels as compared to traffic channels, a lower coding rate and/or a higher level of error correction coding can be used on the control channel to support reliable transmission of the control information even though the information may be received at a lower power level than might be the case if a narrow transmission beam was used.

While use of broad beams for control channels is sometimes suggested, narrow beams are often suggested for the transmission of traffic data to/from a UE. This is because by concentrating the available transmit power into a narrow beam, the signal is more likely to be received at a higher power level than would be the case if the same amount of power was transmitted using a broad beam. The higher the received signal power level, the more likely the UE will be able to recover the data without errors or equivalently, a higher data rate may be supportable. In many cases, use of a narrow beam and the corresponding higher received power level that often results, allows for higher modulation and coding rates, e.g., 16, 32 or 256 Quadrature Amplitude Moduation (QAM) n, to be used as compared to QPSK (4-QAM) and coding rates as high as 0.9. Since narrow beams often allow for high coding rates to be used, they often allow for more data to be transferred in a given amount of time than would be the case if the lower coding rates sometimes used on control channels with a broad beam were used.

While the higher data rates that can often be supported using a narrow beam are often preferred, in the case of a narrow beam the quality of the communications channel can vary considerably from one moment in time to another, particularly if a device is moving or if objects in the environment are moving. This can result in a sudden and rapid deterioration in channel quality particularly if the UE is near the edge of a narrow beam given the sharp falloff of such a beam. Even in cases where a UE is not likely to suffer deterioration in channel quality while a narrow beam is used to communicate with an access point, from the overall system perspective using a narrow beam to communicate with a particular UE device may be undesirable since the use of a narrow beam may preclude the possible simultaneous communication with another UE that might be able to communicate if a broad beam were used to communicate user data. Furthermore, when the best narrow beam changes and the UE gets delayed in communicating the new beam information due to inherent latency in the measurement and reporting process, performance can degrade substantially, including the possibility of a dropped connection.

From the above it should be appreciated that there is a need for new methods and/or apparatus which can be used to determine whether a broad or narrow beam should be used to communicate with a UE or multiple UEs in the case where simultaneous communications with multiple UEs can be supported.

SUMMARY

Methods and apparatus for selecting a beam mode and/or beam for communicating with one or more devices are described. The beam mode selection may be, and sometimes is, between a broad beam mode of operation and a narrow beam mode of operation with respect to a particular device. Communication with one or more devices may happen at a given time with the preferred beam mode and/or choice for an individual device sometimes being replaced with a beam mode and/or beam choice which is preferable from an overall system perspective, e.g., because it allows data transmission and/QoS requirements to multiple devices to be supported better than would be achieved if the preferred beam mode and/or beam selection made with respect to an individual device was used.

In various embodiments a first communications device receives information about the channel quality of a beam which the communications device can use to communicate with another communications device. The first communications device may be an access point or UE, but in many cases is an access point with an array antenna. In the present application access point and base station are used interchangeably. A base station may be implemented as gNodeB.

While not limited to being an access point, the invention will be explained using an example where the access point is in communication with one or more UEs (User Equipment devices). In various embodiments, devices, e.g., UEs, which may communicate with the first communications device, e.g., access point such as a base station, provide feedback information to the first communications device with regard to channel quality of one or more beams and/or other information relating to beams which are available for use in communicating with the first communications device. For purposes of explaining the invention the first communications device will now be referred to as access point which is exemplary of a device which may serve as the first communications device.

The beam quality feedback information includes channel quality information from which the access point can, and sometimes, does determine a variance, e.g., change in channel quality for the beam over time for a particular individual beam.

In various embodiments the access point determines on a per device basis, for one or more devices, a set of broad beams which can be used and a set of narrow beams which can be used. The set of broad beams identified for a device, e.g., first UE, will normally include the best X broad beams from the perspective of channel quality, which can be used to communicate with the first UE. Similarly a set of Y narrow beams which can be used for communications with the first UE. The set of Y narrow beams normally include the best Y narrow beams from the perspective of channel quality for communicating with the first UE. X and Y are positive integers often, but not always, greater than one.

Sets of broad and narrow beams are identified for multiple UEs, e.g., each UE, to which data may be transmitted or received during a time period for which beam selection is being made. One or more beams may be used during each communications time period.

It should be appreciated that when multiple beams are used at the same time, they should face in somewhat different directions to avoid distorting the beam pattern and transmitting high power in undesired directions.

The access point normally communicates with one or more UEs during a given uplink or downlink time period. In accordance with some features, the access point selects the beam to be used to communicate with one or more devices, e.g., UEs, and the devices are notified of the beam selection.

While from an individual device perspective a narrow beam may often be the preferred beam when the beam is reliable over time in accordance with one feature of the invention, a broad beam may be preferred when the channel quality associated with a narrow beam exhibits an undesirable variance, e.g., a channel variance over a first threshold, where channel variance can be in terms of changes, e.g., variance, in channel quality or changes, e.g., variance, in the number of beam in use that have taken place per unit time.

The access point selects the preferred beam to use to communicate with a UE based on the beam channel quality information associated with the beam and UE. In cases of high channel quality variance a broad beam may be preferred even though a narrow beam may provide higher data rates for very brief periods of time. It should be appreciated that the potential loss of channel quality and the ability to communicate user data, may and sometimes does, outweigh the potential advantage of a higher data rates offered by use of a narrow beam particularly in cases where a large channel variance has been detected. In such a case, a broad beam with a lower variance in channel quality may be, and sometimes, is selected over a narrow beam with a higher quality variance.

In accordance with some embodiments, a preferred beam is selected by the communications device, e.g., access point, for communicating with a UE or UEs. Communication with the UE may proceed using the preferred beam selected based on the UE provided information.

However, in some, but not necessarily all, embodiments an initial preferred beam selection for communication with a UE is reviewed and potentially modified taking into consideration factors relating to communications with other UEs and potential overall communication from the perspective of the access point and/or a request for a particular mode of operation from a UE. For example, when a first UE has little data to transmit or receive, a check may be made, and sometimes is made, to see if use of a broad beam rather than a narrow beam would allow for transmission to or from a second UE in proximity to the first UE without degrading communication with the first UE to an unacceptable level. In such a case where use of a broad beam can allow for successful communication to both the first UE and a second UE, the access point may override an initial narrow beam selection to select a broad beam communications mode and broad beam to use to communicate to the first UE and the second UE, e.g., in parallel.

While such an approach may result in the first UE receiving signals at a lower power level than would be achieved if a narrow beam were used to communicate with the first UE, the switching to a broad beam mode and broad beam can be desirable from an overall system perspective, since the total user data throughput to UEs may be greater, taking into consideration that data is communicated to both the first UE and the second UE in parallel, than would be the case if the broad beam was used, and data was communicated with only the first UE during the same communications interval. Similarly, transmitting to two or more UEs simultaneously can help reduce latency for certain types of packets e.g. signaling packets or TCP acknowledgment packets etc.

While at some times a single beam may be used to communicate with one or more device at other times multiple beams, e.g., M beams, may be used at the same time to communicate with multiple devices where M is an integer greater than one.

While overall data throughput or the goal of serving multiple UEs is the main consideration in some decisions to override a narrow beam preference, in other cases satisfying QoS (Quality of Service) requirements for a particular device may be a consideration triggering the switch from a narrow beam to a broad beam or some other beam change. For example, if one device has a low latency communications requirement and was in proximity to another device without such latency constraints, a decision might be made to communicate with the device without low latency constraints using a broad beam rather than a narrow beam to allow the device with low latency data transmission constrains to receive at least some data with relatively little latency.

In various embodiments a device, e.g., UE, can request a narrow or broad beam mode of communications operation, e.g., based on measurements indicating rapid changes in beam quality or rapid changes in a sorted beam list sorted based on channel quality and/or other information the UE has available such as information about the type of data to be transmitted and/or desired communications QoS level. The access point can take the UE's broad or narrow beam mode request into consideration when making a mode and beam selection.

The access point communicates the mode and/or beam selection to the UE prior to communicating with the UE using the determined mode. As should be appreciated by identifying a specific narrow and/or broad beam to be used during a given time period the base station can indicate both the mode (broad or narrow) and specific beam to use in a single communication without the need to split out the mode and beams into separate pieces of information although that is also possible.

The access point and/or UE can, and sometimes do, implement the transmit/receive beam by setting phase shifters in a transmit and/or receive path to specific values corresponding to the selected beam. The values may be, and sometimes are, stored in what is referred to as a codebook. The values in the codebook are accessed based on the selected mode/beam information and used to control the phase shifters in the transmit and/or receive path to implement the desired beam.

While features used in some but not all embodiments have been described in terms of altering an initial preferred narrow beam selection to a broad beam mode of operation and broad beam selection, the methods can be used to choose a different narrow beam than the beam initially selected as a preferred beam when a narrow mode of communication is to be used and/or selecting a beam other than the beam with the best channel quality to a device when a broad beam mode of operation is determined to be used. From the perspective of an individual device this may sometimes appear as a suboptimal selection of a beam mode and/or beam from an overall system throughput or QoS perspective it can be desirable since the needs of multiple devices may be satisfied by the switch in beam mode and/or beam selection.

In some but not all embodiments, the beam selection techniques used for data traffic, e.g., selection of beams for communication of voice data, user application data such as gaming or other applications, and/or other traffic data are different form the beam and/or mode selection techniques used for selecting the beams and modes used for control channels used to communicate with a device, e.g., UE. Thus in at least some embodiments the beam mode and/or beam selected for communicating control information to or from a UE is different from the beam mode and/or beam selected for communicating traffic data to/from a UE.

An exemplary method of operating a first communications device, in accordance with some embodiments, comprises: receiving, from a second communications device, signal quality information for a first period of time corresponding to beams transmitted by the first communications device; identifying a set of X broad beams having the best reported quality, said set of X beams including one or more broad beams; identifying a set of Y narrow beams having the best reported quality, said set of Y beams including one or more narrow beams; determining a first quality variance for the best Y beam for the first period of time; and determining a preferred beam mode based on at least the first quality variance, said preferred beam mode being one of a broad beam mode or a narrow beam mode.

An exemplary first communications device, in accordance with some embodiments, comprises: an antenna array including antenna elements; receiver circuitry coupled to said antenna elements, said receiver circuitry being configured to receive, signal quality information from a second communications device, for a first period of time corresponding to beams transmitted by the first communications device; a processor configured to: i) identify a set of X broad beams having the best reported quality, said set of X beams including one or more broad beams; ii) identify a set of Y narrow beams having the best reported quality, said set of Y beams including one or more narrow beams; iii) determine a first quality variance for the best Y beam for the first period of time; and iv) determine a preferred beam mode based on at least the first quality variance, said preferred beam mode being one of a broad beam mode or a narrow beam mode; and transmitter circuitry coupled to said antenna elements, said transmitter circuitry configured to transmit information indicating the preferred beam mode and beam to the second communications device.

While various features and methods have been described, all embodiments need not include all features or steps mentioned in the summary. Numerous additional features and embodiments are discussed in the detailed description which follows.

BRIEF DESCRIPTION OF THE FIGURES

FIG. 14C is a third part of a flowchart of an exemplary method of operating a first communications device, e.g., an access point/base station, in accordance with an exemplary embodiment.

FIG. 14, comprises the combination of FIG. 14A, FIG. 14B and FIG. 14C.

FIG. 16B is a second part of a drawing of exemplary data/information, which may be included in a wireless communications device in accordance with an exemplary embodiment.

FIG. 16 comprises the combination of FIG. 16A and FIG. 16B.

DETAILED DESCRIPTION

Figure 1:
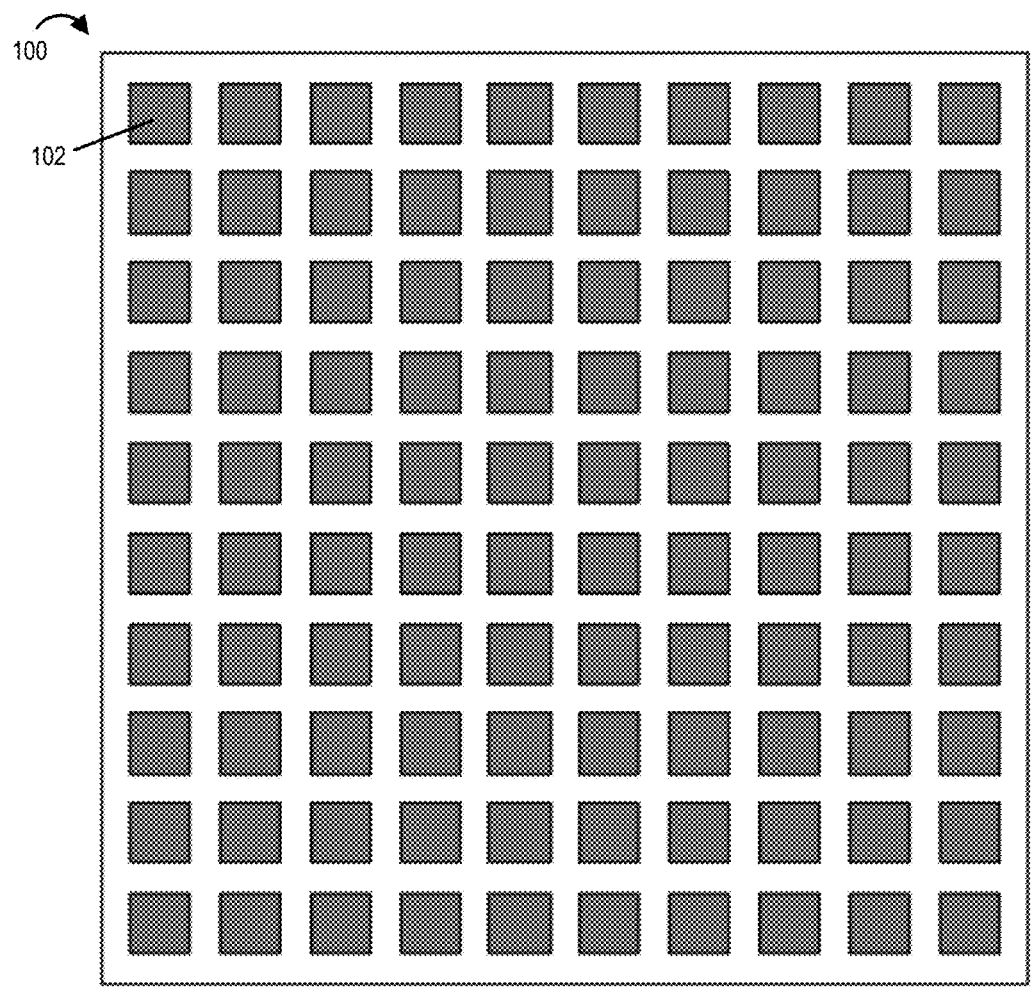
FIG. 1 is a drawing of an exemplary multi-element antenna array in accordance with an exemplary embodiment.

FIG. 1 is a drawing of an exemplary multi-element antenna array 100 in accordance with an exemplary embodiment. Exemplary multi-element antenna array 100 includes 100 antenna elements 102. Multi-element antenna array 100 may be used by a communications device, e.g., a base station, supporting beam forming, with different phase shifts being applied to component signals of a beam communicated via different elements of the antenna array. In some embodiments, multi-element antenna array 100 can be, and sometimes is used to transmit a plurality of beams concurrently, e.g., up to M beams. In some embodiments, multi-element antenna array 100 can be, and sometimes is used to receive a plurality of beams concurrently, e.g., up to M beams. Beams communicated via antenna array 100 include, e.g., a set of narrow beams and a set of wide beams.

Figure 2:
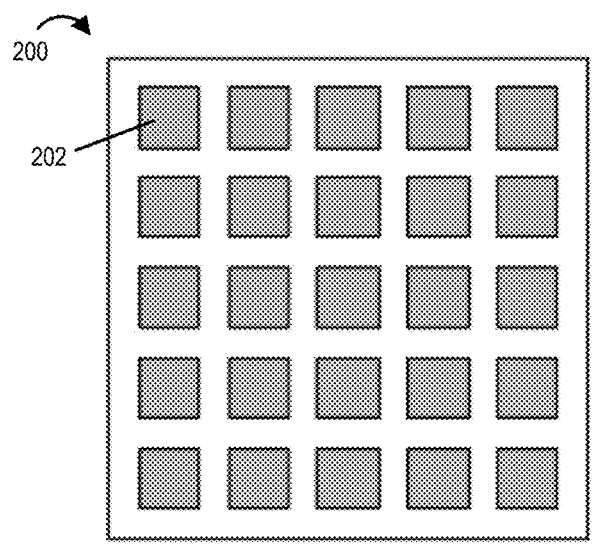
FIG. 2 is a drawing of another exemplary multi-element antenna array in accordance with an exemplary embodiment.

FIG. 2 is a drawing of another exemplary multi-element antenna array 200 in accordance with an exemplary embodiment. Exemplary multi-element antenna array 200 includes 25 antenna elements 202. Multi-element antenna array 200 may be used by a communications device, e.g., a base station, supporting beam forming, with different phase shifts being applied to component signals of a beam communicated via different elements of the antenna array. In some embodiments, multi-element antenna array 200 can be, and sometimes is, used to transmit a plurality of beams concurrently, e.g., up to M beams. In some embodiments, multi-element antenna array 200 can be, and sometimes is used to receive a plurality of beams concurrently, e.g., up to M beams. Beams communicated via antenna array 200 include, e.g., a set of narrow beams and a set of wide beams.

Figure 3:
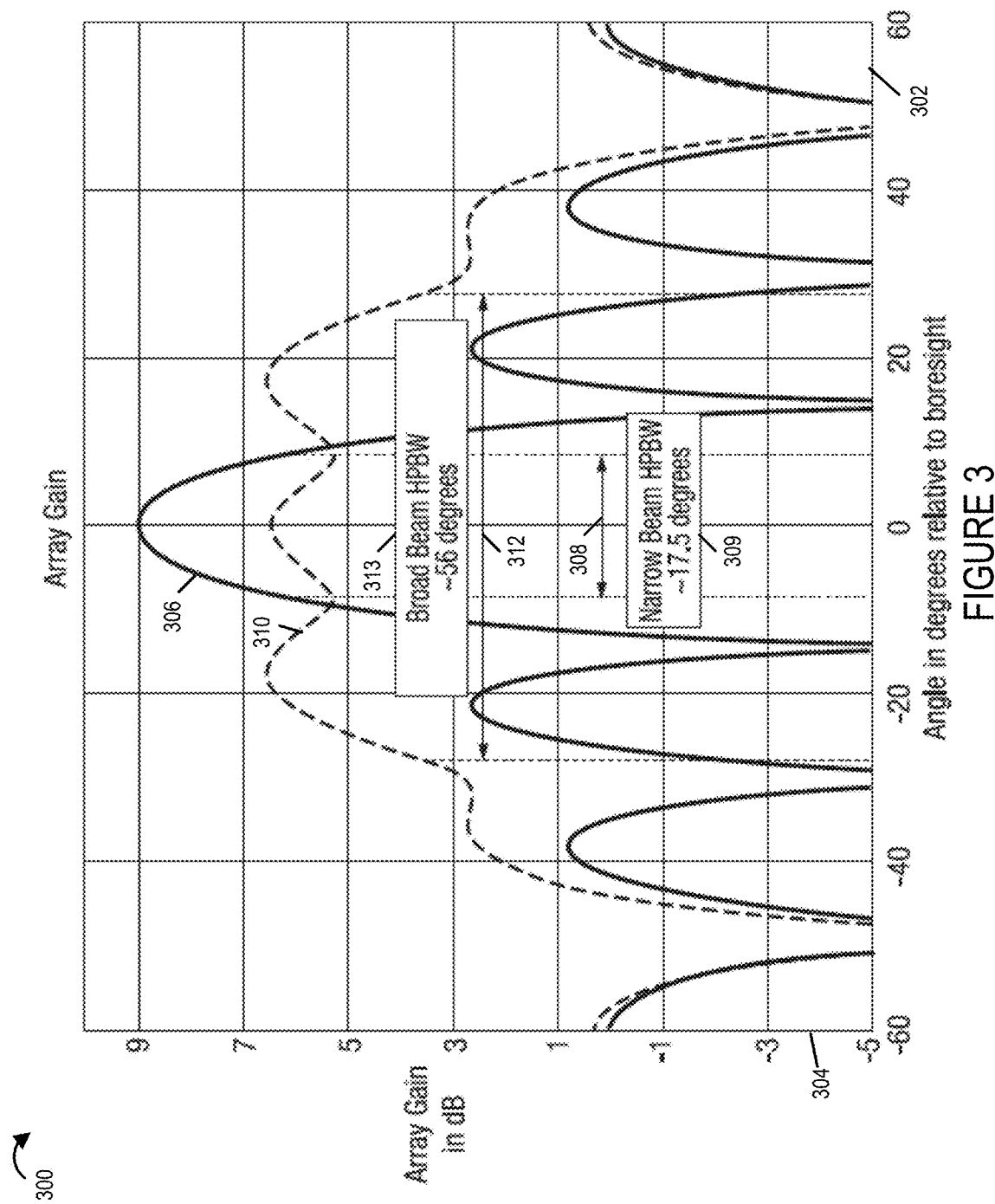
FIG. 3 is a drawing illustrating array gain curves for exemplary beams in accordance with an exemplary embodiment.

FIG. 3 is a drawing 300 illustrating array gain curves for exemplary beams in accordance with an exemplary embodiment. Horizontal axis 302 represents angle in degrees relative to boresight and shows a range of −60 degrees to +60 degrees. Vertical axis 304 represents array gain in dB. Curve 306 is a gain curve for an exemplary narrow beam centered at 0 degrees relative to boresight. The narrow beam of curve 306 has a half power beam (HPBW) 308 which corresponds to approximately 17.5 degrees, as indicated by box 309. Curve 310 is a gain curve for an exemplary broad beam centered at 0 degrees relative to boresight. The broad beam of curve 310 has a half power beam (HPBW) 312 which corresponds to approximately 56 degrees, as indicated by box 313. Given the sharp fall off of the narrow beam it should be appreciated that the channel conditions of a moving device in a narrow beam can change dramatically with relatively little change in device position. The wider beam offers the possibility of a more stable channel quality when the beam is used over a wider area but with the received power potentially being lower than when a narrow beam is used.

Figure 4:
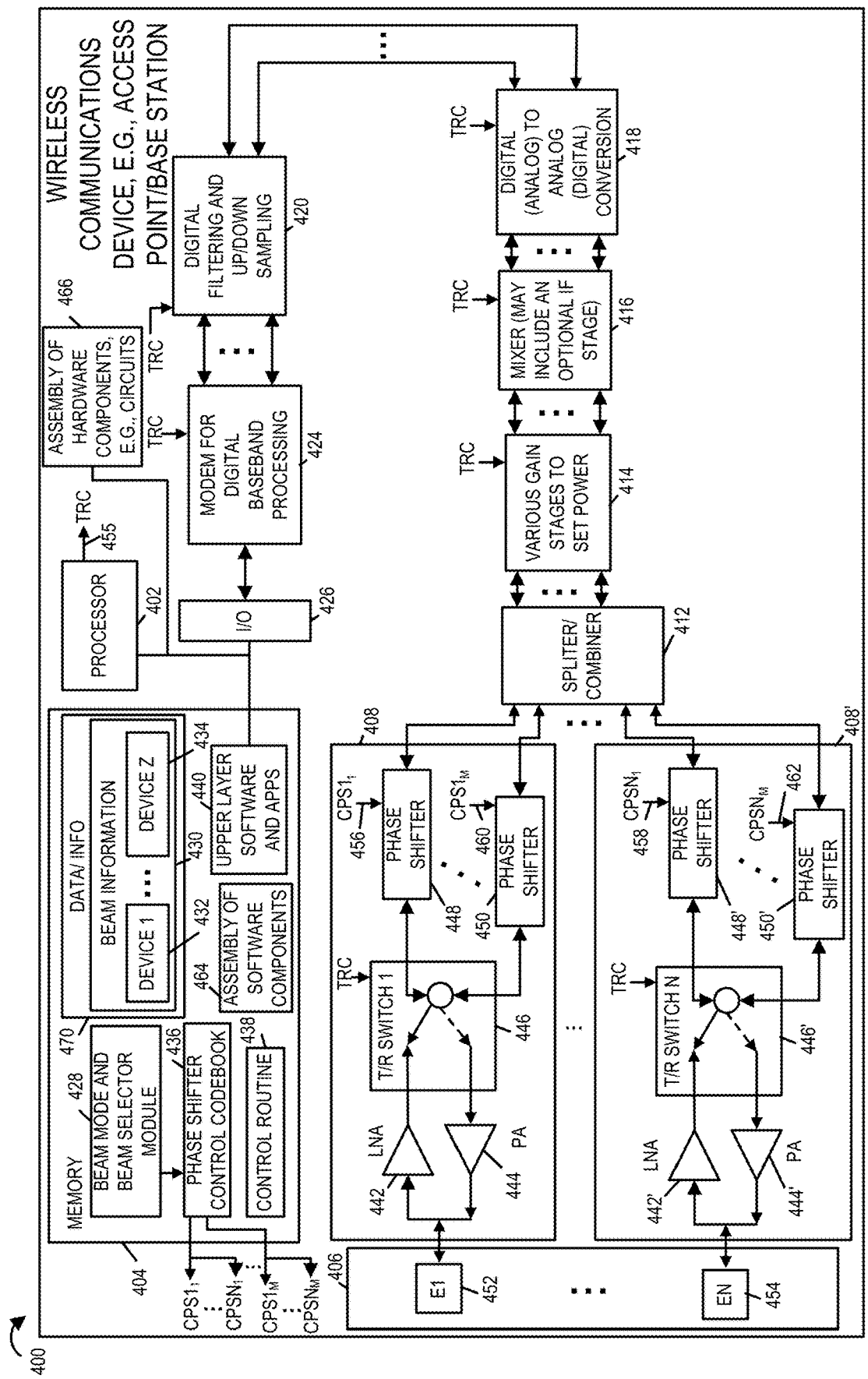
FIG. 4 is a drawing of an exemplary wireless communications device, e.g., an exemplary access point/base station, in accordance with an exemplary embodiment.

FIG. 4 is a drawing of an exemplary wireless communications device 400, e.g., an access point/base station, in accordance with an exemplary embodiment. Wireless communications device 400 is, e.g., a 5G New Radio (NR) gNB, a 4G Long Term Evolution (LTE) eNB, or a WiFi access point. Wireless communications device 400 includes a processor 402, a memory 404, an assembly of hardware components 466, e.g., circuits, a multi-element antenna array 406, an input/output (I/O) component 426, a modem 424 for digital baseband processing, a digital filtering and up/down sampling component 420, a digital (analog) to analog (digital) conversion component 418, a mixer 416, which may optionally include an IF stage, power setting gain stages component 414, splitter/combiner component 412 and a plurality of antenna element interface (antenna element 1 interface 408, . . . , antenna element N interface 408'), coupled together as shown in FIG. 4. Antenna array 406 includes N antenna elements (antenna element E1

452, . . . , antenna element EN 454). Each antenna element (E1 452, . . . , EN 454) is coupled to a corresponding antenna element interface (antenna element interface 1 408, . . . , antenna element interface N 408'), respectively. In some embodiments, antenna array 406 is multi-element antenna array 100 of FIG. 1, and N is 100. In some embodiments, antenna array 406 is multi-element antenna array 100 of FIG. 2, and N is 25.

Memory 404 includes a beam mode and beam selector module 428, data/information 470 including beam information 430, a phase shifter control codebook 436, control routine 438, upper layer software and apps 440, and an assembly of software components 464. In some embodiments, the phase shifter control codebook 436 includes a narrow beam codebook and a broad beam codebook. Based on a selected beam mode, e.g., one or narrow beam mode and broad beam mode, and a selected beam, e.g., information identifying a particular beam, received from beam mode and beam selector module 428, the phase shifter control codebook 436, looks up and determines a set of phase shifts to be applied to a set of phase shifter elements. Wireless communications device 400 is implemented to support a set of up to M concurrent beams. The set of M concurrent beams may include a mixture of narrow beams and broad beams, only narrow beams or only broad beams, e.g., depending upon the determined conditions and reported information from the UE's. The access point may include one such antenna panel or several of them. When more than one antenna panel is included, M beams dedicated to a single panel may be possible. M beams split across panels may also be possible. In such instances switching circuitry between the M beams and the panels can be used as needed.

Beam information 430 includes beam information corresponding to a plurality of devices, e.g., a plurality of UE devices, (UE device 1 beam information 432, . . . , UE device Z beam information 434. Each set of UE device beam information, e.g., device 1 beam information, includes, e.g., received UE reported beam quality information corresponding to detected beams, an identified ordered set of best narrow beams, an identified ordered set of best broad beams, determined beam quality variance information, determined beam quality indicator values, e.g., determined mean beam quality values, a determined preferred beam mode, e.g., one of narrow beam mode and broad beam mode, a determined preferred beam, e.g., information indicating a beam ID value for the determined preferred beam, a final determined preferred beam mode following potential modification considerations, and a final determined preferred beam following potential modification considerations, and traffic data to be communicated to the UE on the final determined preferred beam.

Phase shifter control codebook 436 outputs control signals (CPS11 456, . . . , CPS1N 458), which communicate individual phase shifts to be applied by phase shift devices (phase shifter 448, . . . , phase shifter 448') which are used to form beam 1. Selected beam 1 can be any one of the narrow beams or broad beams supported by codebook 436. Similarly, phase shifter control codebook 436 outputs control signals (CPS1M 460, . . . , CPSNM 462), which communicate individual phase shifts to be applied by phase shift devices (phase shifter 450, . . . , phase shifter 450') which are used to form beam M. Selected beam M can be any one of the narrow beams or broad beams supported by codebook 436, selected beam M being a different selected beam than selected beam 1.

Antennal element 1 interface 408 includes M phase shifters (phase shifter 1 448, . . . , phase shifter M 450), Transmit/Receive (T/R) switch 1 446, low noise amplifier (LNA) 442, and PA 444 coupled together as shown in FIG. 4. Antennal element N interface 408' includes M phase shifters (phase shifter 1 448', . . . , phase shifter M 450'), Transmit/Receive (T/R) switch N 446', LNA 442', and PA 444' coupled together as shown in FIG. 4.

Phase shifter 448 applies the phase shift of signal CPS11 456. Phase shifter 450 applies the phase shift of signal CPS1M 460. T/R switch 1 446 switches between transmit and receive based on TRC signal 455 from processor 402. When TRC signal 455 indicates receive, the wiper arm of the switch 446 connects to the output of LNA 442. When TRC signal 455 indicates transmit, the wiper arm of the switch 446 connects to the input of power amplifier (PA) 442. In the receive mode, a receive signal received via antenna element E1 452 is input to LNA 442, passes through switch 1 446, is input to phase shifters (448, . . . , 450), is phase shifted by the phase shifters (448, . . . , 450), and each of the outputs from the phase shifters (448, . . . 450), which are received (beam 1, . . . , beam M components), respectively, is input to the combiner of splitter/combiner component 412. In the transmit mode, a beam 1 transmit signal is input to phase shifter 448, phase shifted by phase shifter 448, in accordance with the value indicated by control signal CPS11 456, and the phase shifted transmit signal in input to T/R switch 1 446; and a beam M transmit signal is input to phase shifter 450, phase shifted by phase shifter 450, in accordance with the value indicated by control signal CPS1M 460, and the phase shifted transmit signal is input to T/R switch 1 446. In transmit mode, T/R switch 1 446 performs a combining operation and couples the combined signal to the input of PA 444. In transmit mode, the output of T/R switch 1 446, which is the combined output from phase shifter 448, which is a beam 1 component transmit signal, and phase shifter 450, which is a beam M component transmit signal, is input to power amp (PA) 444 and sent to antenna element E1 452, for transmission.

Phase shifter 448' applies the phase shift of signal CPSN1 458. Phase shifter 450' applies the phase shift of signal CPSNM 462. T/R switch N 446' switches between transmit and receive based on TRC signal 455 from processor 402. When TRC signal 455 indicates receive, the wiper arm of the switch 446' connects to the output of LNA 442'. When TRC signal 455 indicates transmit, the wiper arm of the switch 446' connects to the input of PA 442'. In the receive mode, a receive signal received via antenna element EN 454 is input to LNA 442', passes through switch N 446', is input to phase shifters (448', . . . , 450'), is phase shifted by the phase shifters (448', . . . , 450'), and each of the outputs from the phase shifters (448', . . . 450'), which are received (beam 1, . . . , beam M components), respectively, is input to the combiner of splitter/combiner component 412. In the transmit mode, a beam 1 transmit signal is input to phase shifter 448', phase shifted by phase shifter 448', in accordance with the value indicated by control signal CPSN1 458, and the phase shifted transmit signal in input to T/R switch N 446'; and a beam M transmit signal is input to phase shifter 450', phase shifted by phase shifter 450', in accordance with the value indicated by control signal CPSNM 462, and the phase shifted transmit signal is input to T/R switch N 446'. In transmit mode, T/R switch 1 446' performs a combining operation and couples the combined signal to the input of PA 444'. In transmit mode, the output of T/R switch N 446', which is the combined output from phase shifter 448', which is a beam 1 component transmit signal, and phase shifter 450', which is a beam M component transmit signal, is input to power amp (PA) 444' and sent to antenna element EN 454, for transmission. M beams may be and sometimes are used in parallel, e.g., to transmit or receive at a given time from M different UEs.

Processor 402 generates control signal TRC 455 for controlling whether device 400 is operating as a transmitter or receiver at a particular point in time. When TRC signal 455 indicates receive, the T/R switches (T/R switch 1 446, ..., T/R switch N 446') connect their wiper arms to the outputs of the LNAs (LNA 442, ..., LNA 442'), respectively, splitter/combiner component 412 acts as a combiner, power gain stages component 414 is set use components with gains to process received signals, mixer 416 is set to recover signals, e.g., recovering a analog baseband signal from an RF signal, the analog to digital converters of component 418 are controlled to be used, digital filters and the down samplers of component 420 are controlled to be used, and component 424 is controlled to recover data/information from digital baseband signals. Recovered data/information includes information communicated on up to M different beams.

When TRC signal 455 indicates transmit, component 424 is controlled to generate digital baseband signals from data/information, digital filters and the up samplers of component 420 are controlled to be used, the digital to analog converters of component 418 are controlled to be used, mixer 416 is set to mix input analog signals, e.g., baseband-lower frequency analog signals, with higher frequency signals, which optionally includes an intermediate frequency signal, to generate output RF signals to be transmitted from baseband analog signal, power gain stages component 414 is set to use components with gains to generate transmit signals, splitter/combiner component 412 acts as a splitter, and T/R switches (T/R switch 1 446, ..., T/R switch N 446') connect their wiper arms to the inputs of the PAs (PA 444, ..., PA 444'), respectively. Transmitted data/information includes information communicated on up to M different beams, with transmission components for each transmitted beam being transmitted over different antenna elements (E1 452, ..., EN 454.)

Beam mode and beam selector 428 sends signal 405 to phase shifter control codebook 436 identifying one or more beams to be transmitted or received. The identified one or more beams may be all narrow beams, all broad beams, or a mixture of some narrow beams and some broad beams. In this exemplary embodiment, device 400 can form M beams concurrently. For each requested beam, the phase shifter control codebook 436 retrieves a set of N phase shift values to be used in N phase shifters corresponding to the N elements of the antenna array, and generates N control signals. For example, corresponding to requested beam 1, which may be a narrow beam or a broad beam, phase shifter control codebook 436 generates control signals (CPS11 456, ... CPS1N 458), which are sent to phase shifters (448, ..., 448'), respectively. Continuing with the example, corresponding to requested beam M, which may be a narrow beam or a broad beam, phase shifter control codebook 436 generates control signals (CPS1M 460, ... CPSNM 462), which are sent to phase shifters (450, ..., 450'), respectively.

Modem 424 includes M digital baseband processing receive circuits and M digital baseband processing transmit circuits. Digital filtering and up/down sampling component 420 includes M up sampling circuits coupled to M digital filters, and M down sampling circuits coupled to digital filters. Digital (analog) to analog (digital) conversion component 418 includes M digital to analog converters and M analog to digital converters. Mixer component 416 includes M mixers for receive processing and M mixers for transmit processing. Power setting gain stages component 414 includes M receive power components and M transmit power components. While circuitry for a TDD (Time Division Duplexing) embodiment is shown, it should be readily appreciated that the methods and apparatus can also be used with FDD (Frequency Division Duplexing) embodiments.

Figure 5:
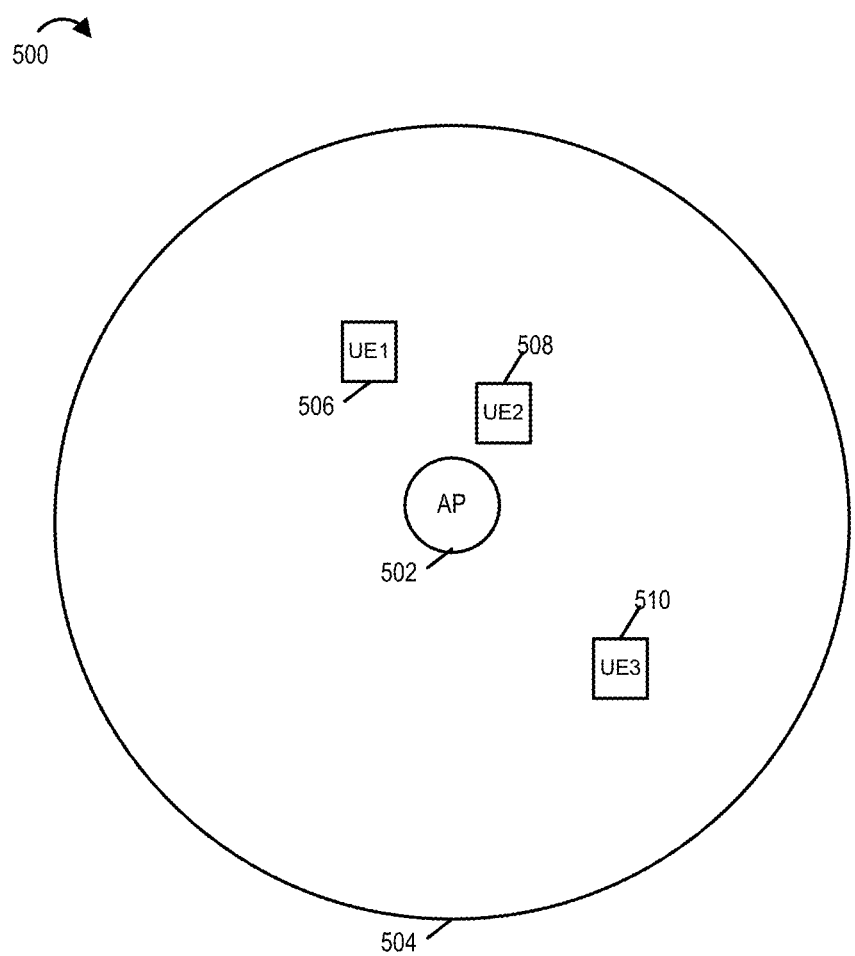
FIG. 5 is a drawing of an exemplary wireless communications system in accordance with an exemplary embodiment.

FIG. 5 is a drawing of an exemplary wireless communications system 500 in accordance with an exemplary embodiment. Wireless communications system 500 includes an access point (AP) 502, e.g., a base station, including a multi-element antenna array and supporting beam forming in accordance with an exemplary embodiment. In some embodiments, access point 502 is implemented in accordance with wireless communications device 400, e.g. AP 400, of FIG. 4. AP 502 is implemented in accordance with features of the present invention, can form both narrow and broad beams, supports multiple, e.g., M concurrent beams, and implements beam management in accordance with the present invention. The exemplary access point 502 has a wireless coverage area 504. Communications system 500 further includes a plurality of wireless terminals including user equipment device 1 (UE 1) 506, UE 2 508 and UE 3 510. UE 1 506, UE 2 508 and UE 3 510 are mobile devices. The UE devices (506, 508, 510 detect and measure signals, e.g., reference signals, transmitted on beams from AP 502, e.g., as part of a beam sweep used to evaluate beams, and report back beam quality information to AP 502. AP 502 processes the reported beam quality information from the UEs and determines a preferred beam mode and a preferred beam for each UE, based on the beam quality information from the UE. In some embodiments, the AP 502 further modifies beam selection corresponding to the UEs based on coverage areas of detected broad beams corresponding to multiple UEs, amounts of data to be communicated to UEs, and/or UE traffic requirements. The AP 502 transmits traffic data to a UE using the final selected beam for the UE.

Figure 6:
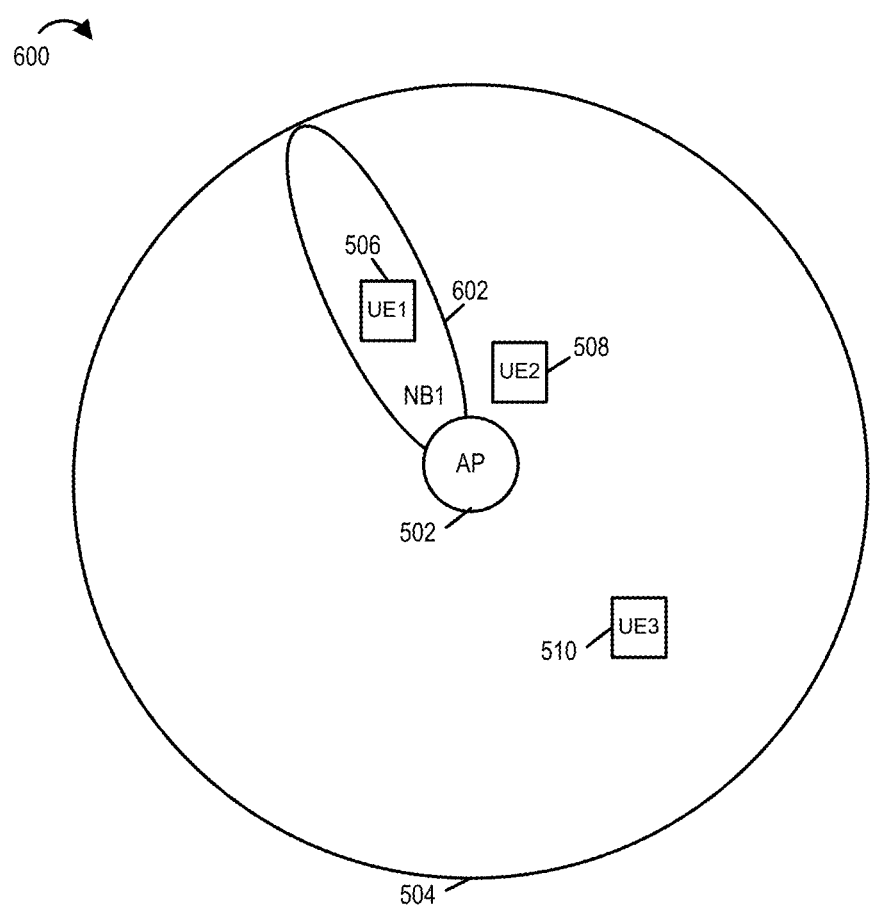
FIG. 6 is a drawing illustrating an example corresponding to system of FIG. 5, in which narrow beam 1 (NB1) is the preferred narrow beam for UE 1 based on reported beam quality information.

FIG. 6 is a drawing 600 illustrating an example corresponding to system 500 of FIG. 5. UE 1 506 is located in coverage area 504 such that narrow beam 1 602 is the preferred (best) narrow beam for UE 1 506 for communications with AP 502. UE 2 508 and UE 3 510 are outside the coverage area for narrow beam 1, and therefore UE 2 508 and UE 3 510 cannot use narrow beam 1 for communications with AP 502.

Figure 7:
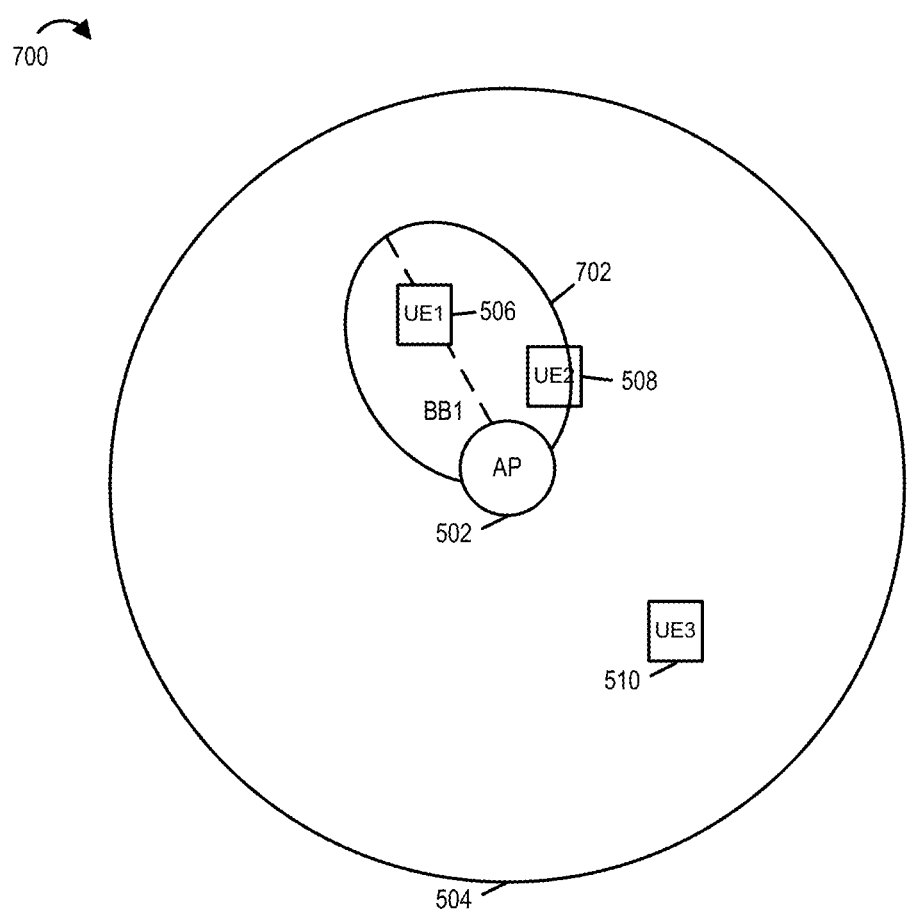
FIG. 7 is a drawing illustrating an example corresponding to system of FIG. 5, in which broad beam 1 (BB1) is the preferred broad beam for UE 1 based on reported beam quality information.

FIG. 7 is a drawing 700 illustrating an example corresponding to system 500 of FIG. 5. UE 1 506 is located in coverage area 504 such that broad beam 1 702 is the preferred (best) broad beam for UE 1 506 for communications with AP 502. UE 2 508 is on the boundary of the coverage area for broad beam 1, and therefore broad beam 1 is not very good for communications between UE 2 508 with AP 502. UE 3 510 is outside the coverage area for broad beam 1, and therefore UE 3 510 cannot use broad beam 1 for communications with AP 502.

Figure 8:
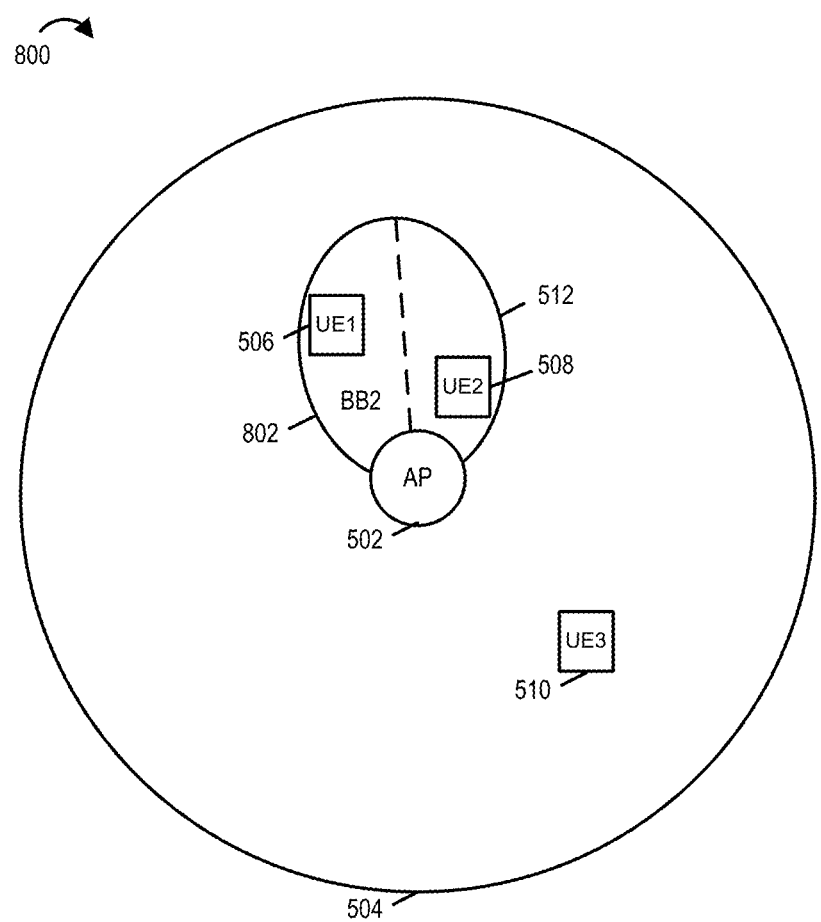
FIG. 8 is a drawing illustrating an example corresponding to system of FIG. 5, in which broad beam 1 (BB2) is an acceptable broad beam for UE 1 and UE 2, based on reported beam quality information.

FIG. 8 is a drawing 800 illustrating an example corresponding to system 500 of FIG. 5. UE 1 506 is located in coverage area 504 such that broad beam 2 702 is an acceptable broad beam for UE 1 506 for communications with AP 502. UE 2 508 is located in coverage area 504 such that broad beam 2 702 is an acceptable broad beam for UE 2 508 for communications with AP 502. UE 3 510 is outside the coverage area for broad beam 1, and therefore UE 3 510 cannot use broad beam 2 for communications with AP 502. In some embodiments, if two UEs, e.g., UE 1 506 and UE 2 508 are relatively close together a broad beam such as BB2 802 is used to transmit to the two UEs instead of two different narrow beams, e.g., because the side lobes of two very close narrow beams would interfere with one another. Multi-beam can be considered a special case of one broad beam formed by two narrow beams being used at the same time. This allows multiplexing more than one user in the freq domain when the users are separated in angular space by using multiple beams directed in different directions to cover an area which may be relatively spread out spatially.

Figure 9:
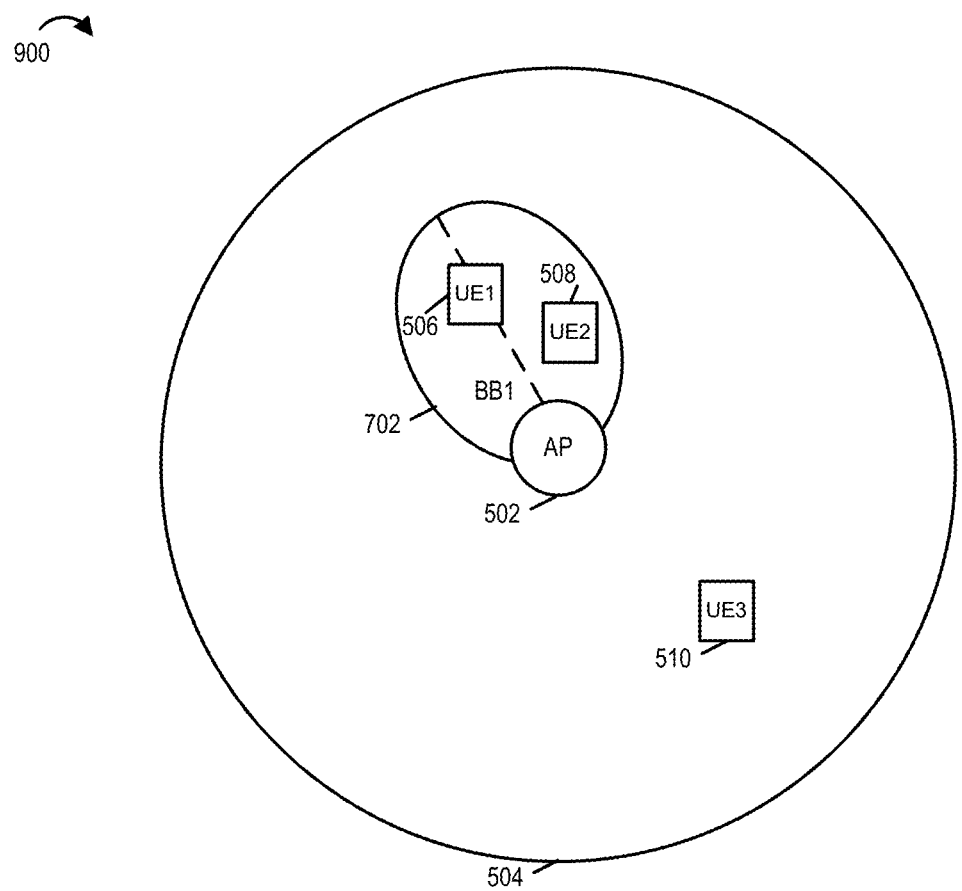
FIG. 9 is a drawing illustrating an example corresponding to system of FIG. 5, in which broad beam 1 (BB1) is the preferred broad beam for UE 1 and broad beam 1 is an acceptable beam for UE 2, based on reported beam quality information.

FIG. 9 is a drawing 900 illustrating an example corresponding to system 500 of FIG. 5. UE 1 506 is located in coverage area 504 such that broad beam 1 702 is the preferred (best) broad beam for UE 1 506 for communications with AP 502. UE 2 508 is within the coverage area for broad beam 1 702, and therefore broad beam 1 702 is acceptable for communications between UE 2 508 with AP 502. UE 3 510 is outside the coverage area for broad beam 1 702, and therefore UE 3 510 cannot use broad beam 1 for communications with AP 502.

Figure 10:
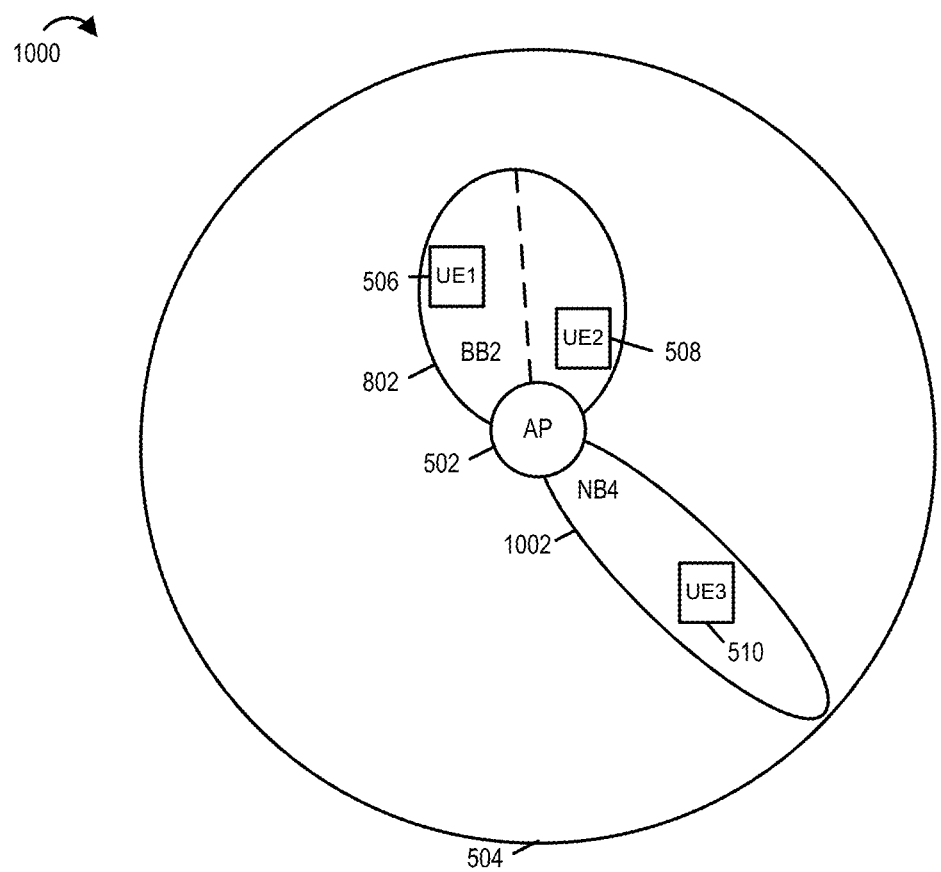
FIG. 10 is a drawing illustrating an example corresponding to system of FIG. 5, in which broad beam 2 (BB2) is an acceptable beam for UE 1 and UE2, and NB2 is the preferred narrow beam for UE 3, based on reported beam quality information.

FIG. 10 is a drawing 1000 illustrating an example corresponding to system 500 of FIG. 5. UE 1 506 is located in coverage area 504 such that broad beam 2 702 is an acceptable broad beam for UE 1 506 for communications with AP 502. UE 2 508 is located in coverage area 504 such that broad beam 2 702 is an acceptable broad beam for UE 2 508 for communications with AP 502. UE 3 510 is located in coverage area 504 such that narrow beam 4 1002 is the preferred (best) narrow beam for UE 3 510.

Figure 11:
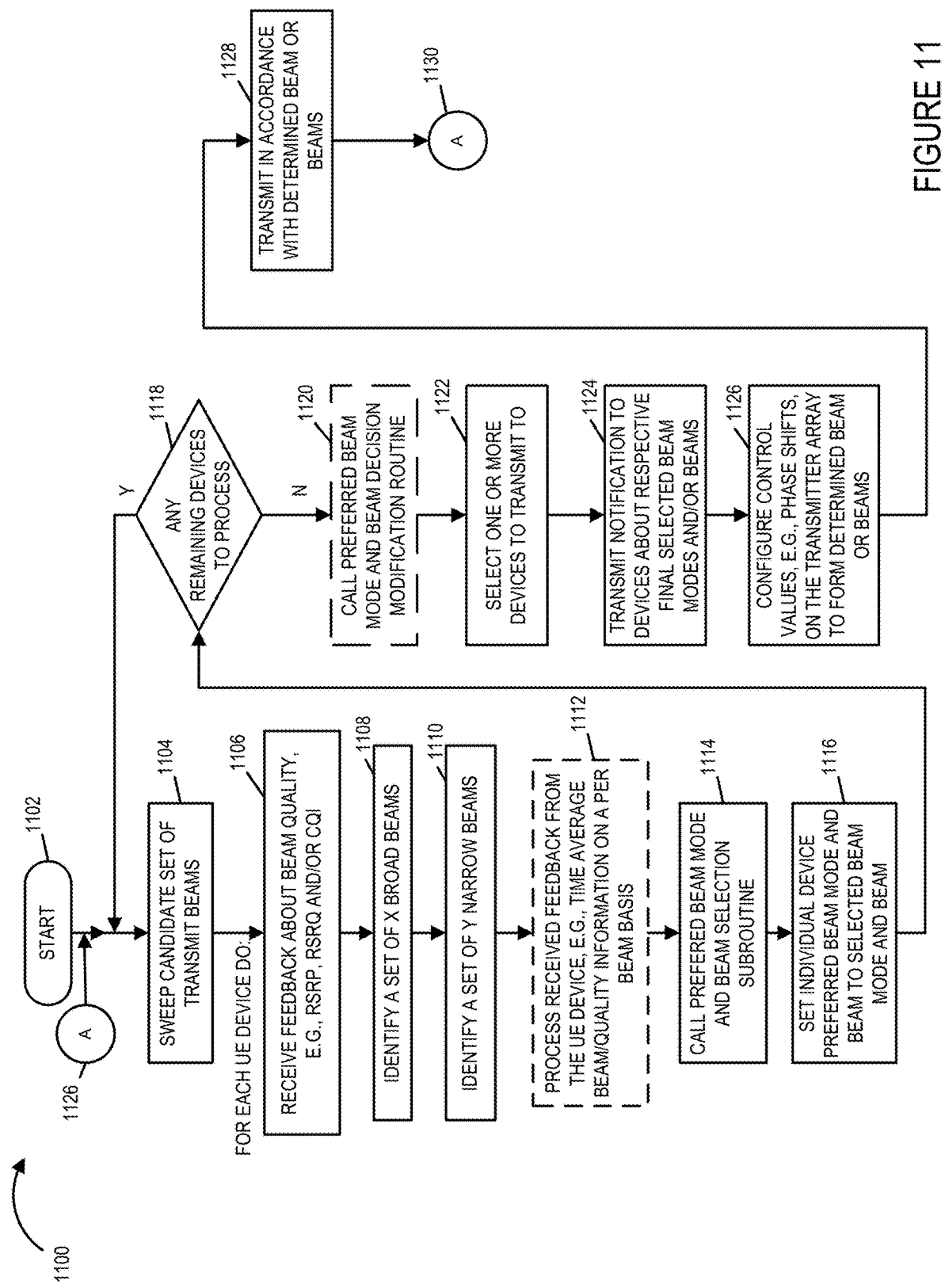
FIG. 11 is flowchart of a main routine an exemplary method of operating a wireless communication device, e.g., an access point/base station, in accordance with an exemplary embodiment.

FIG. 11 is flowchart 1100 of a main routine an exemplary method of operating a wireless communication device, e.g., an access point/base station, in accordance with an exemplary embodiment. The communication device implementing the method of flowchart 1100 is, e.g., communications device 400 of FIG. 4, e.g., an access point/base station, which may be the access point/base station 502 of FIGS. 5-10.

Operation of the exemplary method starts in step 1102, in which the base station is powered on and initialized. Operation proceeds from step 1102 to step 1104. In step 1104, the base station sweeps a set of candidate set of transmit beams. In various embodiments, the candidate set of transmit beams includes both narrow beams and broad beams. Operation proceeds from step 1104 to step 1106. Steps 1106, 1108, 1110, 1112, 1114 and 1116 are performed for each user equipment device which is reporting to the base station in response to the transmitted set of candidate beams.

In step 1106 the base station receives feedback about beam quality, e.g., reference signal received power (RSRP), reference signal received quality (RSRQ) and/or channel quality indicator (CQI) information corresponding to one or more of the candidate beams which were detected by the UE, e.g., beam quality information (time T0 beam quality information 1203, . . . , time Tn beam quality information 1203'). Beam quality information 1203 includes RSRP beam information 12031, RSRQ beam quality information 12032 and CQI beam quality information 12033. In various embodiments, the received beam quality information corresponding to a plurality of beams including both narrow beams and broad beams. Operation proceeds from step 1106 to step 1108 in which the base station identifies a set of X broad beams. Operation proceeds from step 1108 to step 1110, in which the base station identifies a set of Y narrow beams. In some embodiments, operation proceeds from step 1110 to optional step 1112, while in other embodiments, operation proceeds from step 1110 to step 1114. In step 1112 the base station processes the received feedback from the UE device, e.g. time average beam/quality information on a per beam basis. Operation proceeds from step 1112 to step 1114.

Figure 12:
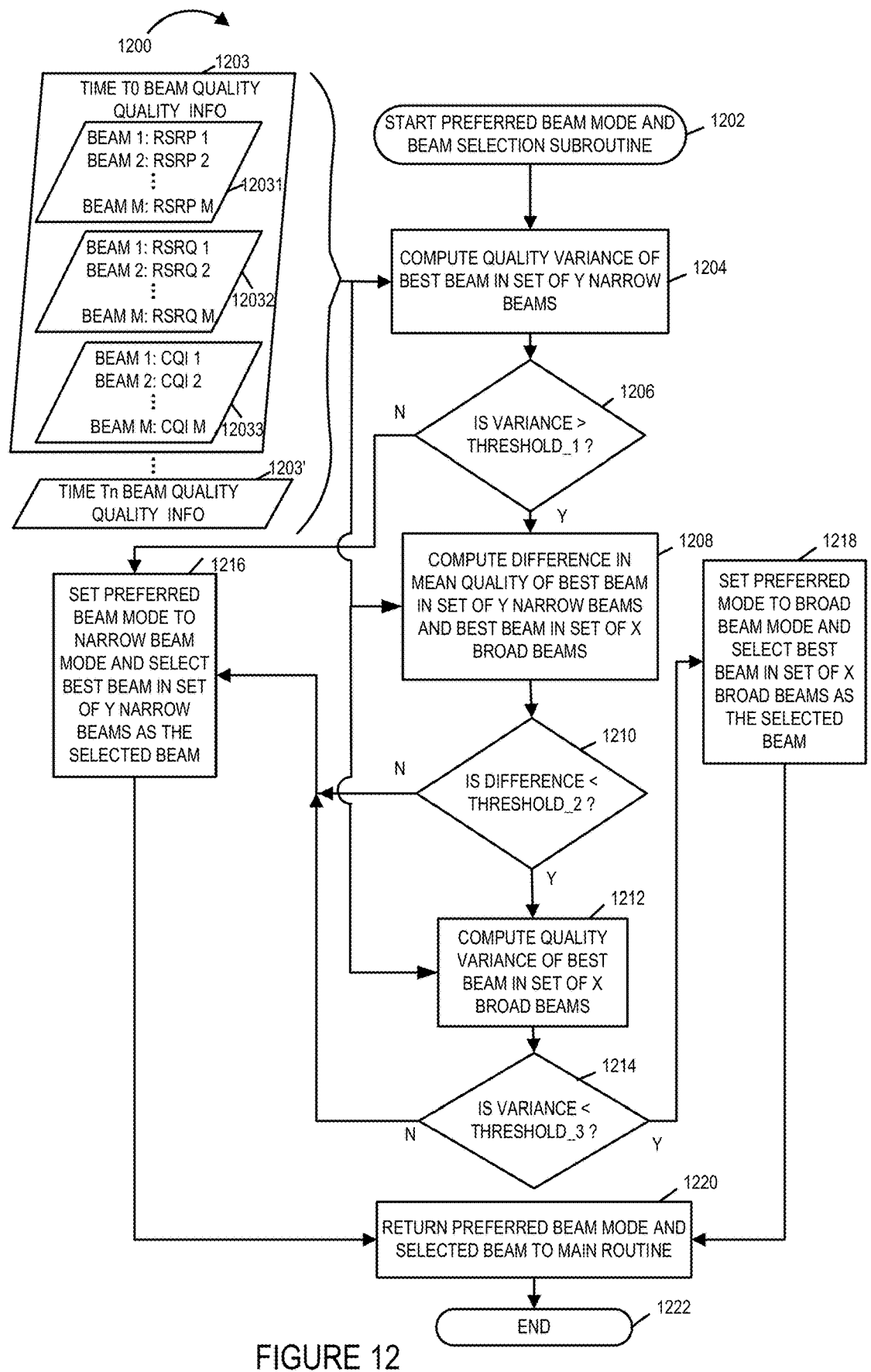
FIG. 12 is a flowchart of an exemplary preferred beam mode and beam selection subroutine in accordance with an exemplary embodiment, said preferred beam mode and beam selection subroutine may be, and sometimes is, called by the main routine of the flowchart of FIG. 11.

In step 1114 the base station's main routine calls the preferred beam mode and beam selection subroutine which determines a preferred beam mode and a selected beam for the UE. In some embodiments the preferred beam mode and beam selection subroutine is implemented by the method of flowchart 1200 of FIG. 12.

Operation of the preferred beam mode and beam selection subroutine starts in step 1202, e.g., in response to the call of step 1114, and proceeds to step 1204. In step 1204 the base station computes the quality variance of the best beam in the set of Y narrow beams, e.g., using beam quality information (time T0 beam quality information 1203, . . . , time Tn beam quality information 1203'). In some the computed quality variance for the best Y beam is for a time period of 5 milliseconds or less. In some such embodiments the computed quality variance for the best Y beam is for a time period of 1 millisecond or less. Operation proceeds from step 1204 to step 1206. In step 1206 the base station determines if the quality variance of the best beam in the set of Y narrow beams is greater than threshold_1. If the determination is that the variance is not greater than threshold_1, then operation proceeds from step 1206 to step 1216, in which the base station sets the preferred beam mode to narrow beam mode and selects the best beam in the set of Y narrow beams as the selected beam for the UE. However, in step 1206 if the determination is that the variance is greater than threshold_1, then operation proceeds from step 1206 to step 1208.

In step 1208 the base station computes the difference in the mean quality of the best beam in the set of Y narrow beams and mean quality of the best beam in the set of X broad beams. Operation proceeds from step 1208 to step 1210.

In step 1210 the base station determines if the difference in the mean quality is less than threshold_2. If the difference is not less than threshold_2, then operation proceeds from steps 1210 to step 1216, in which the base station sets the preferred beam mode to narrow beam mode and selects the best beam in the set of Y narrow beams as the selected beam for the UE. However, in step 1210 if the determination is that the difference is less than threshold_2, then operation proceeds from step 1210 to step 1212.

In step 1212 the base station computes the quality variance of the best beam in the set of X broad beams. In some embodiments the computed quality variance for the best X broad beam is for a time period of 5 milliseconds or less. In some such embodiments the computed quality variance for the best X broad beam is for a time period of 1 millisecond or less but this is only exemplary and not used in all embodiments. Operation proceeds from step 1212 to step 1214. In step 1214 the base station determines if the quality variance of the best beam in the set of X broad beams is less than threshold_3. If the determination is that the variance is not less than threshold_3, then operation proceeds from step 1214 to step 1216, in which the base station sets the preferred beam mode to narrow beam mode and selects the best beam in the set of Y narrow beams as the selected beam for the UE. However, in step 1214 if the determination is that the variance is less than threshold_3, then operation proceeds from step 1214 to step 1218, in which the base station sets the preferred beam mode to broad beam mode and selects the best beam in the set of X broad beams as the selected beam for the UE.

Operation proceeds from step 1216 or step 1218 to step 1220. In step 1220 the subroutine returns the determined preferred beam mode and the selected beam for the UE to the main routine. Operation proceeds from step 1220 to subroutine end step 1222.

Returning to step 1114 in the main routine, operation proceeds from step 1114 to step 1116. In step 1116 the base station sets the individual device preferred beam mode and the beam to the selected beam mode and beam, which was returned from the preferred beam mode and beam selection subroutine. Operation proceeds from step 1116 to step 1118.

In step 1118 the base station determines if there are any remaining devices to process. If the determination is that there are additional devices to process, then operation proceeds from step 1118, to step 1104. However, if the determination of step 1118 is that there are no additional devices to process, then operation proceeds from step 1118, to optional step 1120 or to step 1122.

Figure 13:
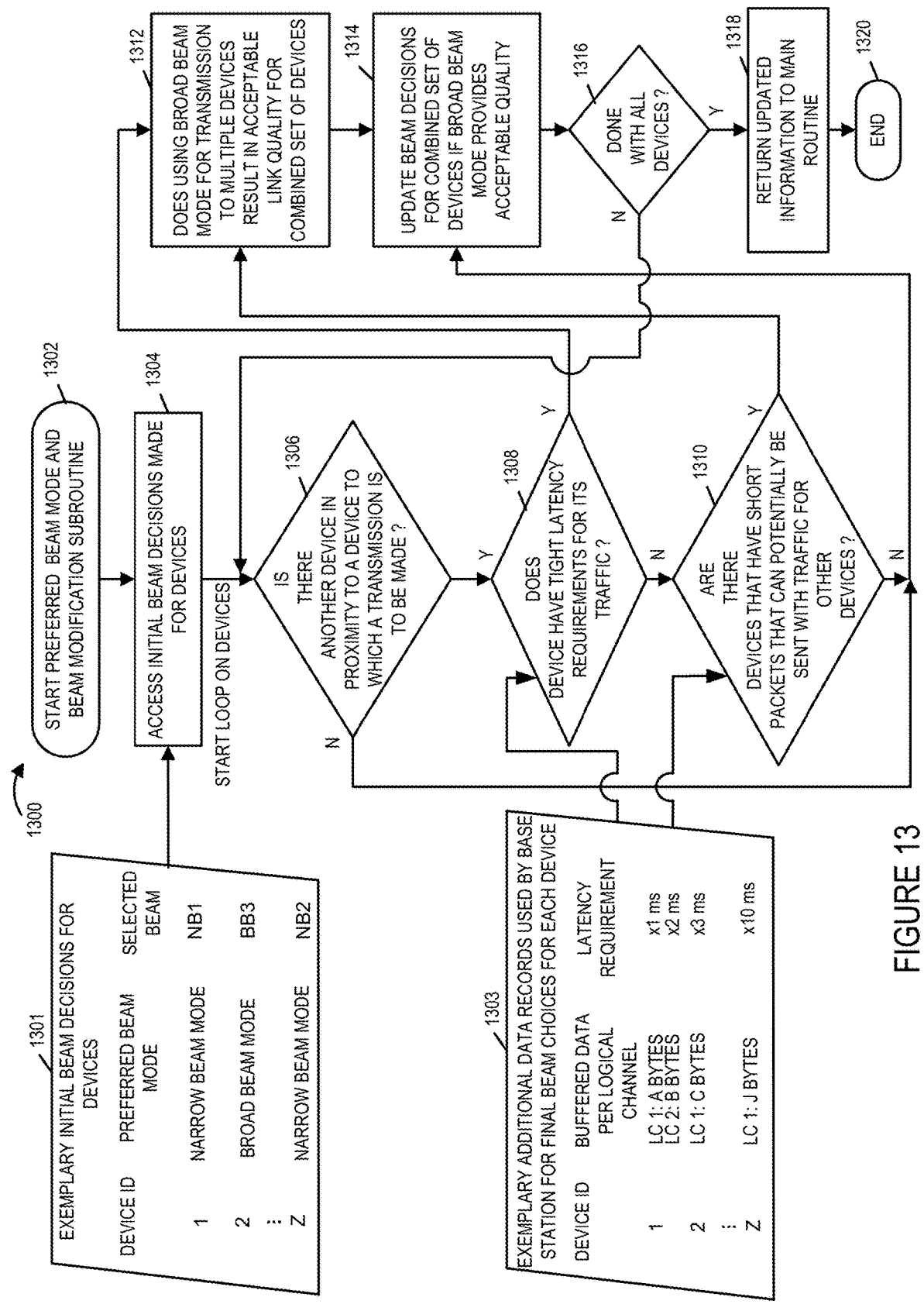
FIG. 13 is a flowchart of an exemplary preferred beam mode and beam modification subroutine in accordance with an exemplary embodiment, said preferred beam mode and beam modification subroutine may be, and sometimes is, called by the main routine of the flowchart of FIG. 11.

In optional step 1120, the main routine calls a preferred beam mode and beam decision modification subroutine. In some embodiments the preferred beam mode and beam modification subroutine is implemented by the method of flowchart 1300 of FIG. 13.

Operation of the preferred beam mode and beam modification subroutine starts in step 1302 in response to the call of step 1120. Operation proceeds from start step 1302 to step 1304. In step 1304 the base station accesses the initial beam decisions made of the UE devices, e.g., accesses exemplary initial beam decisions for devices information 1301, which was stored in multiple iterations of step 1116, one iteration of step 1116 for each UE. Initial beam decisions for devices information 1301 includes, e.g., for each of the UEs an initially determined preferred beam mode and information indicating a corresponding selected beam. Operation proceeds from step 1304 to step 1306, in which processing starts for a first UE device.

In step 1306, the base station determines if there is another device in proximity to a device to which a transmission is to be made. If there is not another device in proximity to a device to which a transmission is to be made, then operation proceeds from step 1306 to step 1314; otherwise, operation proceeds from step 1306 to step 1308.

In step 1308 the base station determines, using latency information included in additional data records 1303, if the device has tight latency requirements for its traffic. If the determination is that the device does not have tight latency requirements for its traffic, then operation proceeds from step 1308 to step 1310; otherwise operation proceeds from step 1308 to step 1312.

In step 1310 the base station determines, using buffered data information included in additional data records 1303, if there are devices that have short packets that can potentially be sent with traffic for other devices. If the determination of step 1310 is that there are not devices that have short packets that can potentially be sent with traffic for other devices, then operation proceeds from step 1310 to step 1314; otherwise, operation proceeds from step 1310 to step 1312.

In step 1312 the base station determines if using broad beam mode for transmission to multiple devices results in acceptable link quality for the combined set of devices. Operation proceeds from step 1312 to step 1314. In step 1314 the base station updates beam decisions for a combined set of devices if broad beam mode provides acceptable quality. Operation proceeds from step 1314 to step 1316.

In step 1316 the base station determines if processing is done with all devices. If the determination of step 1316 is that the processing is not done with all devices, then operation proceeds from step 1316 to step 1306; Step 1316 may be and sometimes is part of a base station processing loop that involves processing relating to a sorted list of devices to be scheduled. The sorting may be on the basis of scheduling priorities, typically considered by base station schedulers. If operation does not proceed from step 1316 to step 1306 processing proceeds from step 1316 to step 1318. In step 1318 the preferred beam mode and beam modification subroutine returns the updated information to the main routine. Operation proceeds from step 1318 to subroutine end step 1320.

Returning to step 1120 in the main routine in step 1120 the main routine receives and stores updated beam mode information and updated beam selection information. Operation proceeds from step 1120 to step 1122. In step 1122 the base station selects one or more devices, e.g. one or more UEs, to transmit to. For example, during some periods of time the base station selects a single device to transmit to, or receive from, using a single beam. During other periods of time the base station selects two or more devices to transmit to using a single beam. In still other periods of time the base station selects multiple devices to transmit to, or receive from, using multiple beams. When multiple devices are being transmitted to, the preferred beam selected for each of the different devices selected for communication during a given time period may be used assuming the beams are distinct from one another. The beams which are used may be narrow beams, broad beams or a combination of broad and narrow beams. For example FIG. 10 shows an example where a broad beam 802 and a narrow beam 1002 are used at the same time with the broad beam being used to communicate to/from multiple UE device and the narrow beam 1002 being used to communicate with a single UE 510. Operation proceeds from step 1122 to step 1124. In step 1124 the base station transmits notification to devices, e.g., UEs, about respective final selected beam modes and/or beams. Transmission is optional in some embodiments. Sometimes if the UE has old information on which beam was selected and that does not require an update because it is unchanged, the base station may not transmit beam notification, although it will still normally send a scheduling notification even if a beam notification is not being sent. Operation proceeds from step 1124 to step 1126.

In step 1126 the base station configures control values, e.g., phase shifts, on the transmitter array to form the determined beam or beams. Operation proceeds from step 1126 to step 1128.

In step 1128 the base station transmits in accordance with the determined beam or beams. Operation proceeds from step 1128, via connecting node A 1130 to step 1104.

Figure 14A:
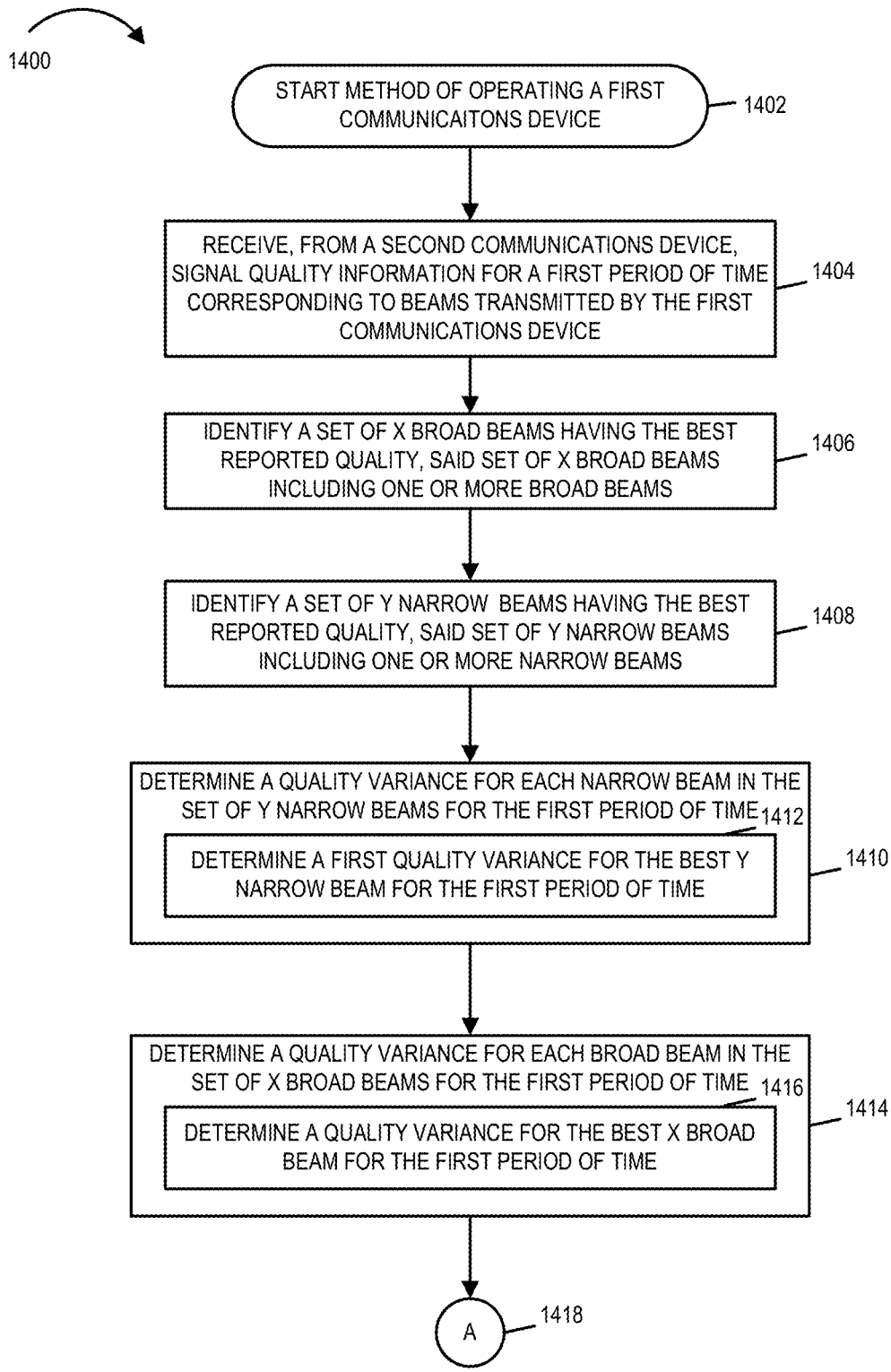
FIG. 14A is a first part of a flowchart of an exemplary method of operating a first communications device, e.g., an access point/base station, in accordance with an exemplary embodiment.
Figure 14B:
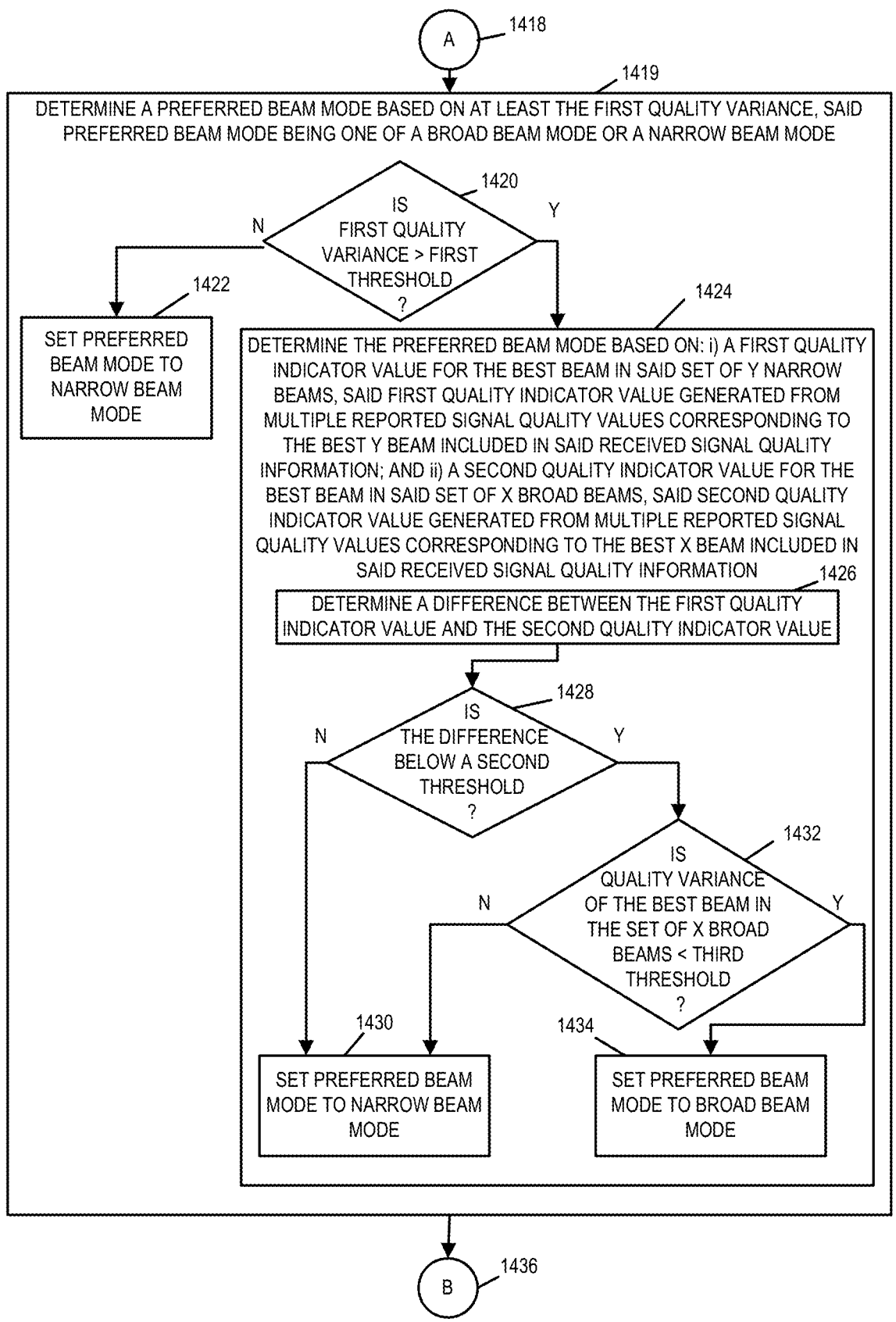
FIG. 14B is a second part of a flowchart of an exemplary method of operating a first communications device, e.g., an access point/base station, in accordance with an exemplary embodiment.

FIG. 14, comprising the combination of FIG. 14A, FIG. 14B and FIG. 14C is a flowchart 1400 of an exemplary method of operating a first communications device in accordance with an exemplary embodiment. Operation starts in step 1402 in which the first communications device, e.g., an access point (AP) such as wireless communications device 400 of FIG. 4 or AP 502 of FIGS. 5-10, is powered on and initialized and proceeds to step 1404.

In step 1404 the first communications devices receives, from a second communications device, e.g., a wireless terminal such as UE 1 506 of FIGS. 5-10, signal quality information for a first period of time corresponding to beams transmitted by the first communications device. Operation proceeds from step 1404 to step 1406.

In step 1406 the first communications device identifies a set of X broad beams having the best reported quality, said set of X broad beams including one or more broad beams. Operation proceeds from step 1406 to step 1408.

In step 1408 the first communications device identifies a set of Y narrow beams having the best reported quality, said set of Y narrow beams including one or more narrow beams. Operation proceeds from step 1408 to step 1410.

In step 1410 the first communications device determines a variance for each narrow beam in the set of Y narrow beams for the first period of time. Step 1410 includes step 1412 in which the first communications device determines a first quality variance for the best Y narrow beams for the first period of time. In some embodiments, the first quality variance is for a time period of 5 milli-seconds or less. In some such embodiments, the first quality variance is for a time period of 1 milli-second or less. This is exemplary and in not intended to be limiting of other embodiments. In some embodiments, in millimeter wavelength communications there may be, and sometimes are, 8 transmission slots per millisecond. Operation proceeds from step 1410 to step 1414.

In step 1414 the first communications device determines a variance for each broad beam in the set of X broad beams for the first period of time. Step 1414 includes step 1416 in which the first communications device determines a quality variance for the best X broad beam for the first period of time. In some embodiments, the second quality variance is for a time period of 5 milli-seconds or less. In some such embodiments, the second quality variance is for a time period of 1 milli-second or less. Operation proceeds via connecting node A 1418 from step 1414 to step 1419.

In step 1419 the first communications device determines a preferred beam mode based on at least the first quality variance, said preferred beam mode being one of a broad beam mode or a narrow beam mode. Step 1419 includes steps 1420, 1422 and 1424. In step 1420 the first communications device determines if the first quality variance (best Y narrow beam quality variance) is greater than a first threshold. If the determination of step 1420 is that the first quality threshold is not greater than the first threshold, then operation proceeds from step 1420 to step 1422, in which the first communications device sets the preferred beam mode to narrow beam mode. Thus, if the variance of the best Y narrow beam is small, the best Y narrow beam is considered reliable and thus will be used, if the preferred beam decision is not later overruled, to support simultaneous (fdm) transmissions to multiple devices. However, if the determination of step 1420 is that the first quality threshold is greater than the first threshold, then operation proceeds from step 1420 to step 1424.

In step 1424 the first communications device determines the preferred beam mode based on: i) a first quality indicator value for the best beam in said set of Y narrow beams, said first quality indicator value being generated from multiple reported signal quality values corresponding to the best Y beam included in said received signal quality information; and ii) a second quality indicator value for the best beam in said set of X broad beams, said second quality indicator value being generated from multiple reported signal quality values corresponding to the best X beam included in said received signal quality information. In some embodiments, the first quality indicator value is an average or mean quality value for the best Y narrow beam, and the second quality indicator value is an average or mean quality value for the best X broad beam. Step 1424 includes steps 1426, 1428, 1430 1432 and 1434.

In step 1426 the first communications device determines a difference between the first quality indicator value and the second quality indicator value. Operation proceeds from step 1426 to step 1428. In step 1428 the first communications device determines if the difference between the first quality indicator value and the second quality indicator value is below a second threshold. If the determination of step 1428 is that the difference is not below the second threshold, then operation proceeds from step 1428 to step 1430 in which the first communications device sets the preferred beam mode to narrow beam mode. However, if the determination of step 1428 is that the difference is below the second threshold, then operation proceeds from step 1428 to step 1432.

In step 1432 the first communications device determines if the quality variance of the best beam in the set of X broad beams is less than a third threshold. If the determination of step 1432 is that the quality variance of the best beam in the set of X broad beams is not below the third threshold, then operation proceeds from step 1432 to step 1430, in which the first communications device sets the preferred beam mode to narrow beam mode. However, if the determination of step 1432 is that the quality variance of the best beam in the set of X broad beams is below the third threshold, then operation proceeds from step 1432 to step 1434 in which the first communications device sets the preferred beam mode to broad beam mode.

Operation proceeds from step 1419, via connecting node B 1436, to step 1438 in which the first communications device makes a decision whether or not to modify the preferred beam mode. In some but not all embodiments, step 1438 includes optional steps 1450, 1452, 1454, and 1456. Step 1438 includes steps 1440, 1442, 1444 and 1446 which will be in addition to the optional steps when the optional steps are included.

In step 1450 the first communications device receives a request from the second communications device for a particular beam mode, said requested beam mode being one of a broad beam mode or a narrow beam mode, e.g., based on second communications device applications or Quality of Service (QoS) needs. Many devices may not make such requests and may leave it up to the base station to make the mode and beam determinations. Accordingly, this step is optional. In some embodiments, step 1450 includes step 1452 in which the first communications device receives from the second communications device a requested beam indicator indicating one of a broad beam mode or a narrow beam mode. The indicator is a requested beam indicator because the mode and/or beam indicated in the request may and often is viewed by the base station as a non-binding request. However in some other embodiments the request may indicate a wireless terminal determination which is binding on the base station. Operation proceeds from step 1450 to step 1454.

In step 1454 the first communications device determines if the second communications device requested a beam mode other than the preferred beam mode. As should be appreciated if the beam mode requested and the preferred beam mode for the device is the same, the preferred beam mode can be left unchanged. If in step 1454 the first communications device determines that the second communications device did not request a different beam mode than the preferred beam mode, then operation proceeds from step 1454, to step 1440. However, if in step 1454, the first communications device determines that the second communications device requested a beam mode which is different than the preferred beam mode, then operation proceeds from step 1454 to step 1456. The most common request for a different beam mode will be for a broad beam mode with the wireless terminal seeking the reliability of a broad beam for a particular application as opposed to the higher throughput possible using a narrow beam which the base station might be inclined to select to support a higher data throughput.

In step 1456, the first communications device determines if the use of a beam, e.g., broad beam. corresponding to the requested beam mode can satisfy received power and/or QoS requirements of the second communications device. If the first communications device determines that the use of a beam corresponding to the requested beam mode can not satisfy received power and/or QoS requirements of the second communications device, then operation proceeds from step 1456 to step 1440. However, if the first communications device determines that the use of a beam corresponding to the requested beam mode can satisfy received power and/or QoS requirements of the second communications device, then operation proceeds from step 1456 to step 1458. In step 1458 the first communications device changes the preferred beam mode to the requested beam mode and sets the preferred beam to the beam of the requested beam mode with the highest channel quality. This will often involve changing from a narrow beam mode to a requested broad beam mode and selecting the best broad beam for communicating with the second communications device as the beam to use. Operation proceeds from step 1458 to step 1440.

While a communications device request is sometimes taken into consideration, a device's preference may be and sometimes are overruled by the base station, e.g., to support simultaneous communication with multiple devices as opposed to just the second communications device.

In step 1440 the first communications device determines if there is a broad beam covering an area in which the second communication device is located and a third communications device, e.g., UE 2 508 or UE 3 510, is located, said broad beam covering said area being a candidate beam. For example, determine if there is a candidate beam in the set of supported broad beams which covers an area in which the second communications device and another communications device is located to see if simultaneous transmissions to both devices can be supported using the candidate broad beam.

If the determination of step 1440 is that there is not a broad beam covering an area in which the second communication device is located and a third communications device is located, then operation proceeds from step 1440 to step 1442, in which the first communications device leaves the preferred beam mode and beam unchanged. However, if the determination of step 1440 is that there is a broad beam covering an area in which the second communication device is located and a third communications device is located, then operation proceeds from step 1440 to step 1444. In step 1444 the first communications device makes a decision as to whether to set the beam mode to broad beam mode and the preferred beam to the candidate beam based on at least one of: traffic requirements, where traffic requirements can and sometimes does include latency requirements. for traffic to be transmitted to at least one of the second and third communications devices; ii) the amount of data to be transmitted to the third communications device; and iii) the amount of data to be transmitted to the second communications device. Step 1442 includes 1444 in which the first communications device decides to set the beam mode to broad beam mode and the preferred beam to the candidate beam based on one or more of: traffic requirements, e.g., QOS such as latency, for traffic to be transmitted to at least one of the second and third communications devices; ii) the amount of data to be transmitted to the third communications device; and iii) the amount of data to be transmitted to the second communications device.

Operation proceeds from step 1438 to step 1447 in which the preferred beam and mode is communicated to the second communications device. In step 1447 other devices may also be informed of a beam and/or mode which will be used to communicate with them, e.g., in parallel with the communication to the second communications device. The second communications device receives the beam and mode information and configures its transceiver accordingly. Operation proceeds from step 1447 to step 1448 in which the first communications device transmits, using a beam corresponding to the preferred beam mode, data, e.g., user data such as voice, application data or other non-control channel data, to the second communications device using the preferred beam as a data communications channel. In embodiments where multiple devices are transmitted to at the same time, optional step 1449 is performed in parallel with, or following step 1448. In step 1449 the first communications device transmits to one or more additional devices, e.g., UEs, using beams selected for communicating with the individual additional devices or using the same beam used for communicating with the second communications device. In this way one or more beams can be used to support communications with multiple devices during a transmission time interval.

The method shown in FIG. 14A can be repeated over and over again to support communication during different communications period for which beam and mode determinations are made, e.g., with the selection process being repeated in an attempt to make beam and mode selections which take into account changes in the environment, channel and/or effect of communications device movement.

Figure 15A:
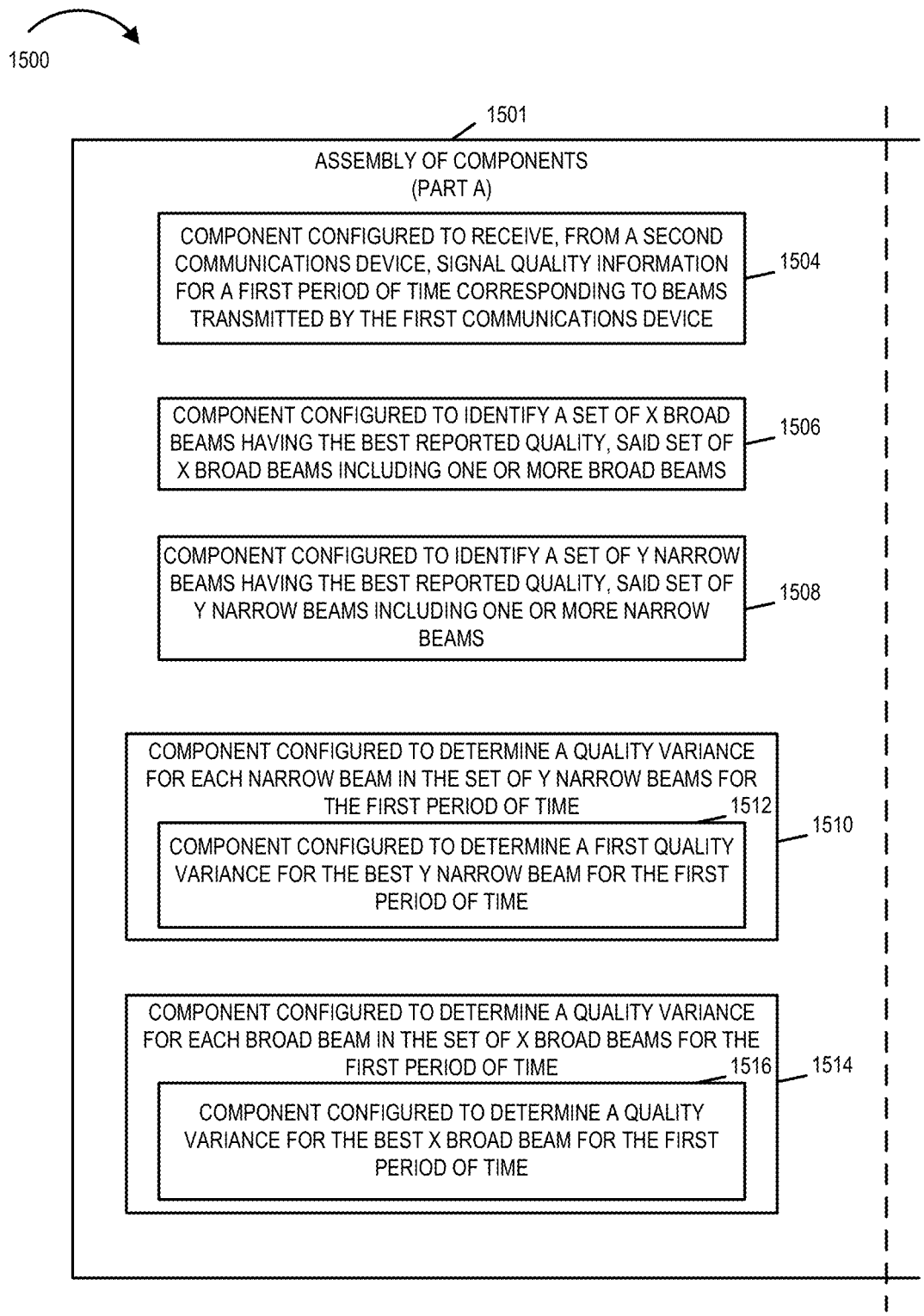
FIG. 15A is a first part of an exemplary assembly of components, which may be included in a wireless communications device, in accordance with an exemplary embodiment.
Figure 15B:
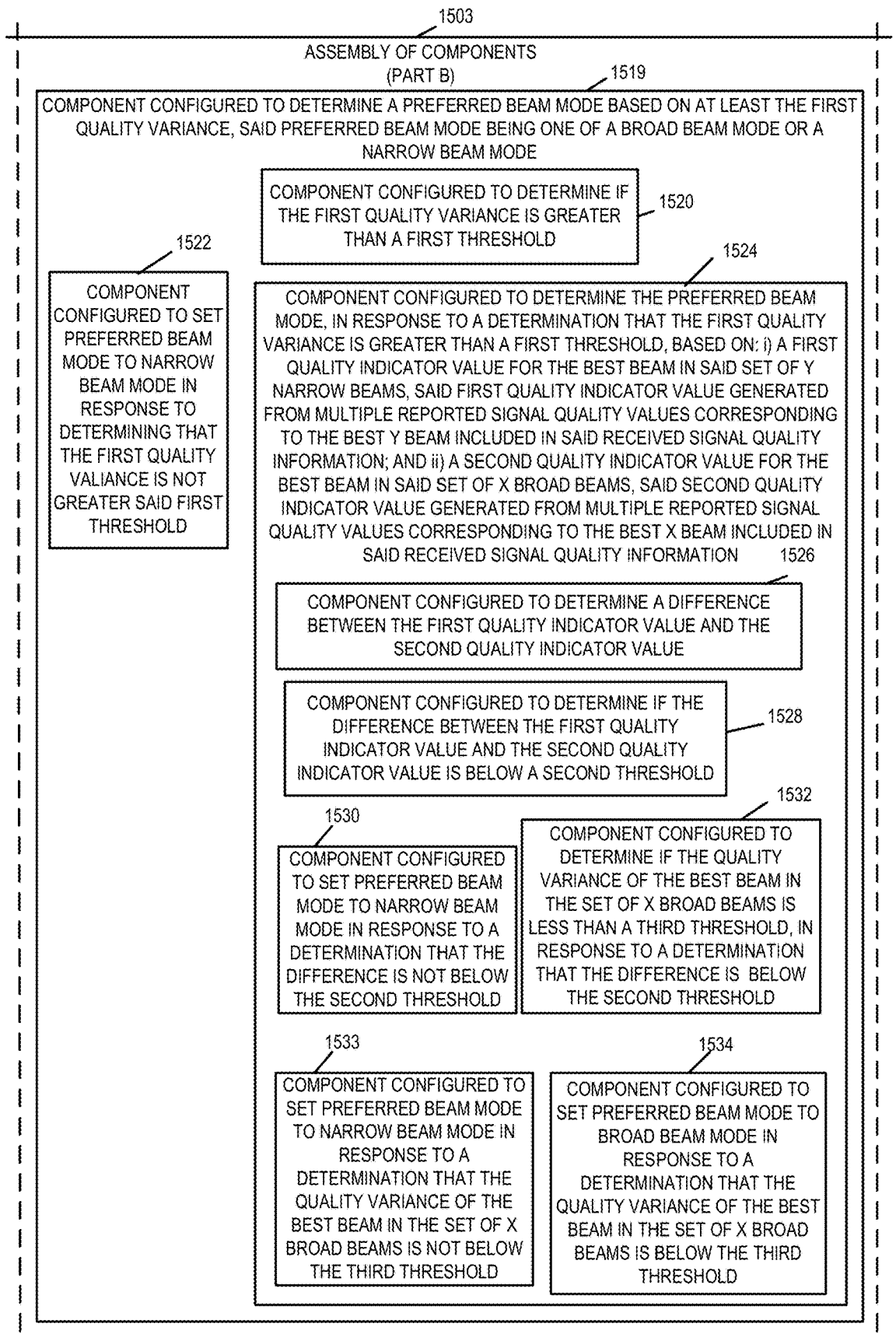
FIG. 15B is a second part of an exemplary assembly of components, which may be included in a wireless communications device, in accordance with an exemplary embodiment.
Figures 15, 15C:
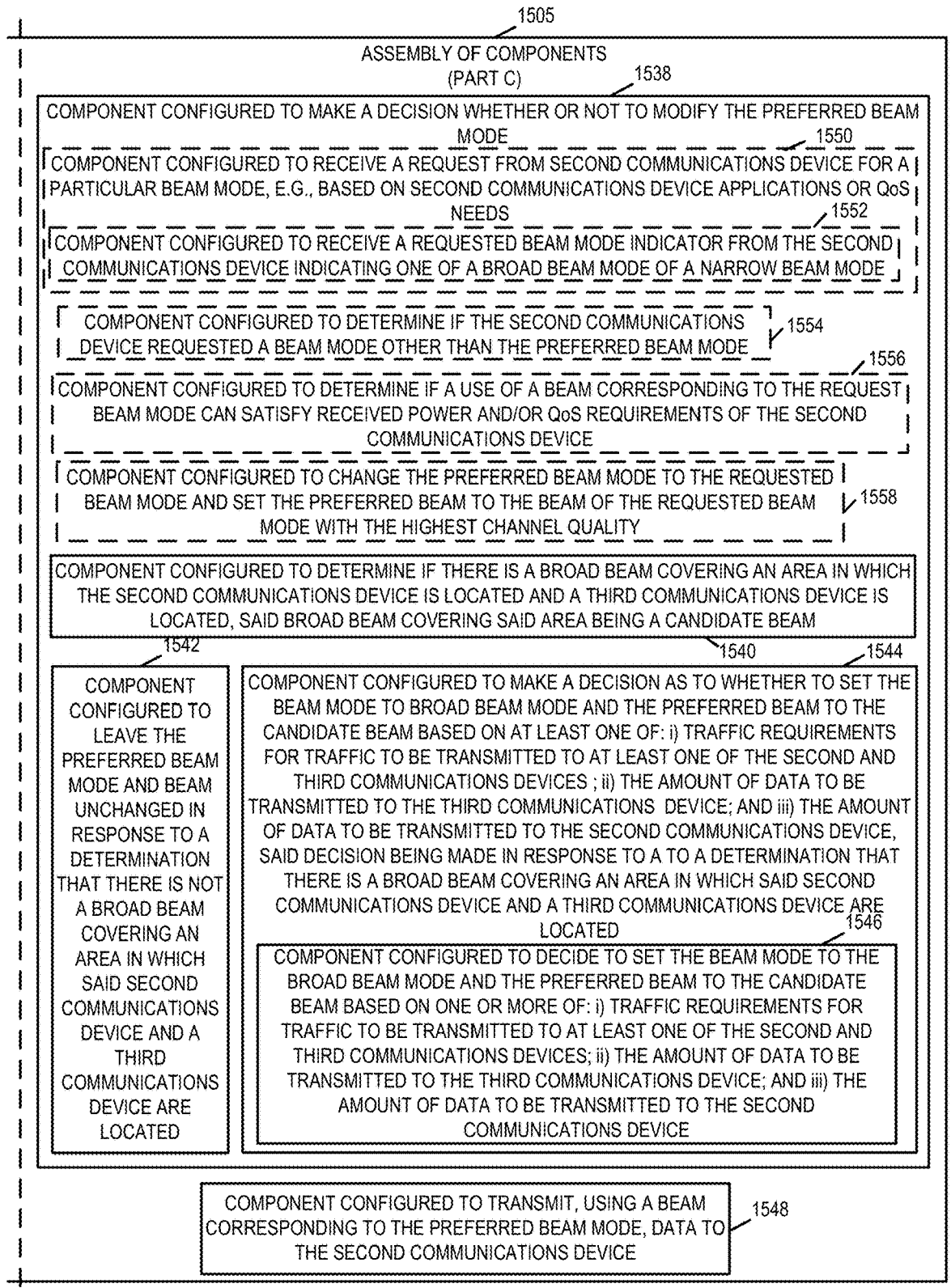
FIG. 15C is a third part of an exemplary assembly of components, which may be included in a wireless communications device, in accordance with an exemplary embodiment.
FIG. 15, comprises the combination of FIG. 15A, FIG. 15B and FIG. 15C.

FIG. 15, comprising the combination of FIG. 15A, FIG. 15B and FIG. 15C, is a drawing of an assembly of components 1500, comprising the combination of Part A 1501, Part B 1503 and Part C 1505, in accordance with an exemplary embodiment. FIG. 15 is a drawing of an exemplary assembly of components 1500, which may be included in a wireless communications device, e.g., an access point or base station. For example, assembly of components is included in wireless communications device 400 of FIG. 4, e.g., an access point/base station. Assembly of components 1500 can be, and in some embodiments is, used in wireless communications device 400 of FIG. 4, AP 500 of FIG. 5-10, a wireless communications device implementing the method of FIGS. 11, 12 and 13, and/or the first communications device, e.g., a wireless communications device such as a base station or access point, implementing the method of flowchart of flowchart 1400 of FIG. 14.

The components in the assembly of components 1500 can, and in some embodiments are, implemented fully in hardware within the processor 402, e.g., as individual circuits. The components in the assembly of components 1500 can, and in some embodiments are, implemented fully in hardware within the assembly of hardware components 466, e.g., as individual circuits corresponding to the different components. In other embodiments some of the components are implemented, e.g., as circuits, within the processor 402 with other components being implemented, e.g., as circuits within assembly of hardware components 466, external to and coupled to the processor 402. As should be appreciated the level of integration of components on the processor and/or with some components being external to the processor may be one of design choice. Alternatively, rather than being implemented as circuits, all or some of the components may be implemented in software and stored in the memory 404 of the wireless communications device 400, with the components controlling operation of wireless communications device 400 to implement the functions corresponding to the components when the components are executed by a processor, e.g., processor 402. In some such embodiments, the assembly of components 1500 is included in the memory 404 as assembly of software components 464. In still other embodiments, various components in assembly of components 1500 are implemented as a combination of hardware and software, e.g., with another circuit external to the processor 402 providing input to the processor 402 which then under software control operates to perform a portion of a component's function. While processor 402 is shown in the FIG. 4 embodiment as a single processor, e.g., computer, it should be appreciated that the processor 402 may be implemented as one or more processors, e.g., computers.

When implemented in software the components include code, which when executed by the processor 402, configure the processor 402 to implement the function corresponding to the component. In embodiments where the assembly of components 1500 is stored in the memory 404, the memory 404 is a computer program product comprising a computer readable medium comprising code, e.g., individual code for each component, for causing at least one computer, e.g., processor 402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 15 control and/or configure the wireless communications device 400 or elements therein such as the processor 402, to perform the functions of corresponding steps illustrated and/or described in the method of one or more of the flowcharts, signaling diagrams and/or described with respect to any of the figures. Thus the assembly of components 1500 includes various components that perform functions of corresponding one or more described and/or illustrated steps of an exemplary method, e.g., steps of the method of the flowcharts 1100, 1200, and 1330 of FIGS. 11, 12 and 13, respectively, steps of the method of flowchart 1400 of FIG. 14 and/or described or shown with respect to any of the other figures.

Assembly of components 1500 includes a component 1504 configured to receive, from a second communications device, signal quality information for a first period of time corresponding to beams transmitted by the first communications device, a component 1506 configured to identify a set of X broad beams having the best reported quality, said set of X broad beams including one or more broad beams, a component 1508 configured to identify a set of Y narrow beams having the best reported quality, said set of Y narrow beams including one or more narrow beams, a component 1510 configured to determine a quality variance for each narrow beam in the set of Y narrow beams for the first time period, and a component 1514 configured to determine a quality variance for each broad beam in the set of X broad beams for the first period of time. Component 1510 includes a component 1512 configured to determine a first quality variance for the best Y narrow beam for the first period of time. Component 1514 includes a component 1516 configured to determine a quality variance for the best X broad beam for the first period of time.

Assembly of components 1500 further includes a component 1519 configured to determine a preferred beam mode based on at least the first quality variance, said preferred beam mode being one of a broad beam mode or a narrow beam mode, a component 1538 configured to make a decision whether or not to modify the preferred beam mode, and a component 1548 configured to transmit, using a beam corresponding to the preferred beam mode, data to the second communications device.

Component 1519 includes a component 1520 configured to determine if the first quality variance is greater than a first threshold, a component 1522 configured to set the preferred beam mode to narrow beam mode in response to determining that the first quality variance is not greater than said first threshold, and a component 1524 configured to determine the preferred beam mode based on i) a first quality indicator value for the best beam in said set of Y narrow beams, said first quality indicator value generated from multiple reported signal quality values corresponding to the best beam in said set of Y in said received signal quality information; and ii) a second quality indicator value for the best beam in said set of X broad beams, said second quality indicator value generated from multiple reported signal quality values corresponding to the best beam in said set of X in said received signal quality information, said determining being in response to determining that the first quality variance is greater than said first threshold. Component 1524 includes a component 1526 configured to determine a difference between the first quality indicator value and the second quality indicator value, a component 1528 configured to determine if the difference between the first quality indicator value and the second quality indicator value is below a second threshold, a component 1530 configured to set the preferred beam mode to narrow beam mode in response to a determination that the difference is not below the second threshold, a component 1532 configured to determine if the quality variance of the best beam in the set of X broad beams is less than a third threshold, in response to determining that the difference is below the second threshold, a component 1553 configured to set the preferred beam mode to narrow beam mode in response to a determination that the quality variance of the best beam in the set of X broad beams is not below the third threshold, and a component 1534 configured to set the preferred beam mode to broad beam mode in response to a determination that the quality variance of the best beam in the set of X broad beams is below the third threshold.

Component 1538 includes a component 1540 configured to determine if there is a broad beam covering an area in which the second communications device is located and a third communications device is located, said broad beam covering said area in which said second communications device and said third communications device are located being a candidate beam, a component 1542 configured to leave the preferred beam mode and beam unchanged in response to a determination that there is not a broad beam covering an area in which said second communications device and a third communications device are located, and a component configured to make a decision as to whether to set the beam mode to broad beam mode and the preferred beam to the candidate beam based on at least one of: i) traffic requirements for the traffic to be transmitted to at least one of the second and third communications devices; ii) the amount of data to be transmitted to the third communications device; and iii) the amount of data to be transmitted to the second communications device, said decision being made in response to a determination that there is a broad beam covering an area in which said second communications device and said third communications device are located. Component 1544 includes a component 1546 configured to decide to set the beam to the broad beam mode and the preferred beam to the candidate beam based on one or more of: i) traffic requirements for the traffic to be transmitted to at least one of the second and third communications devices; ii) the amount of data to be transmitted to the third communications device; and iii) the amount of data to be transmitted to the second communications device.

In some embodiments, component 1538 includes a component 1550 configured to receive a request from the second communications device for a particular beam mode, said request beam mode being one of a broad beam mode or a narrow beam mode, e.g. based on second communications device applications or QoS needs. In some such embodiments, component 1550 includes a component 1552 configured to receive a requested beam mode indicator from the second communications device, said requested beam mode indicator indicating one of a broad beam mode or a narrow beam mode. In various embodiments, component 1538 includes a component 1554 configured to determine if the second communications requested a beam mode other than the preferred beam mode and to control operation as a function of the determination, a component 1556 configured to determine if use of a beam corresponding to the requested beam mode can satisfy the received power and/or QoS requirements of the second communications device and to control operation as a function of the determination, and a component 1558 configured to change the preferred beam mode to the requested beam mode and to set the preferred beam to the beam of the requested beam mode with the highest channel quality, e.g., in response to determining that the use of a beam corresponding to the requested beam mode can satisfy the received power and/or QoS requirements of the second communications device.

Figure 16A:
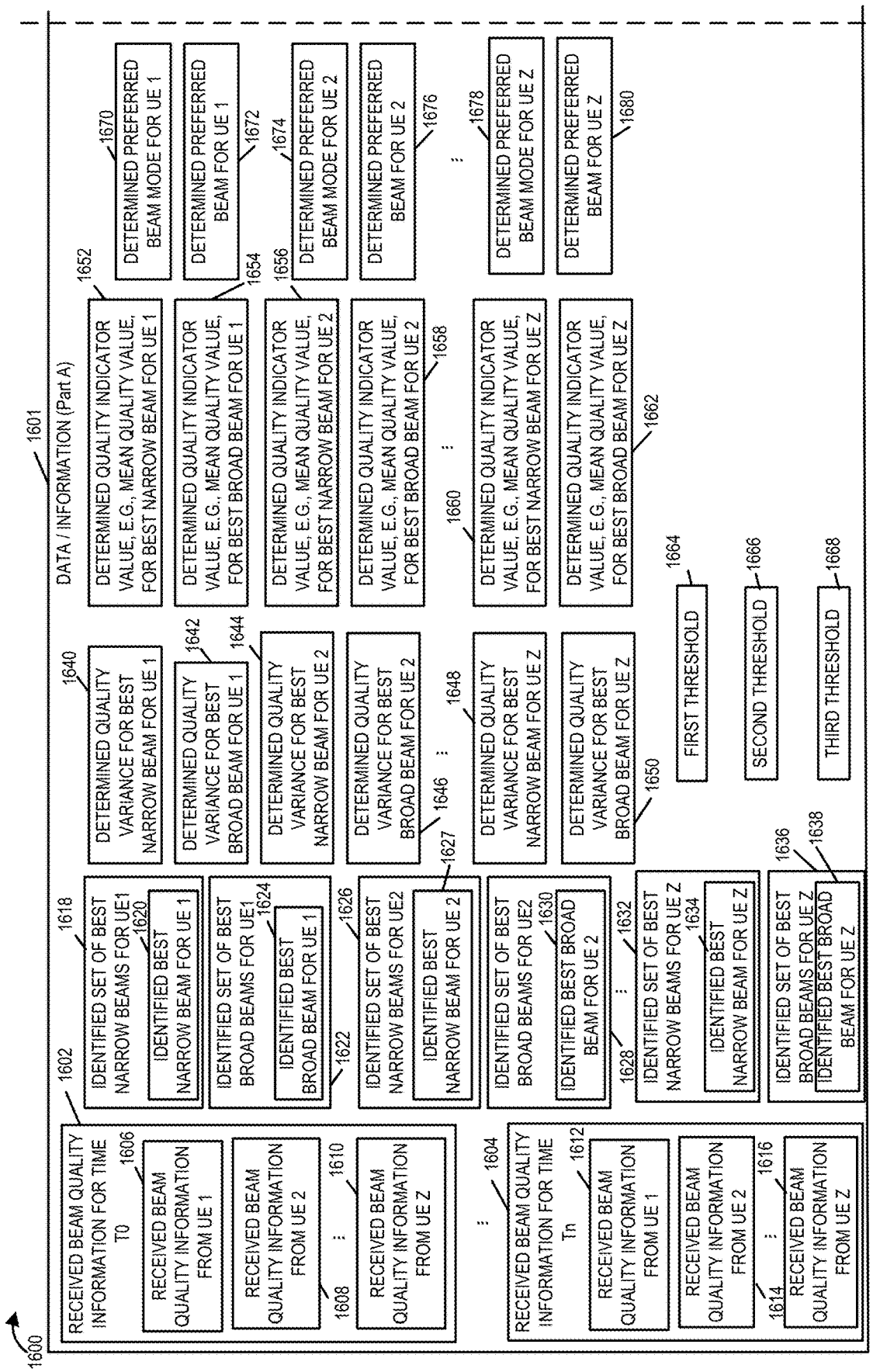
FIG. 16A is a first part of a drawing of exemplary data/information, which may be included in a wireless communications device in accordance with an exemplary embodiment.

FIG. 16, comprising the combination of FIG. 16A and FIG. 16B, is a drawing of exemplary data/information 1600, comprising the combination of Part A 1601 and Part B 1603, which may be included in a wireless communications device in accordance with an exemplary embodiment. Data/information 1600 is, e.g., data/information 470 including in memory 404 in wireless communications device 400, e.g., an access point/base station of FIG. 4.

Data/information 1600 includes received beam quality information for a plurality of times (received beam quality information for time T0 1602, . . . , received beam quality information for time Tn 1604). Received beam quality information for time T0 includes received beam quality information from UE 1 1606, received beam quality information from UE 2 1608, . . . , received beam quality information from UE Z 1610. Received beam quality information for time Tn includes received beam quality information from UE 1 1612, received beam quality information from UE 2 1614, . . . , received beam quality information from UE Z 1616. Each set of received beam quality information, e.g., received beam quality information from UE 1 1606 includes reported signal quality information corresponding to beams transmitted from the first communications device, e.g., AP 400, which were detected by the UE, e.g., UE 1. A set of received beam quality information may, and sometimes does include beam quality information corresponding to one or more detected beams, and the one or more detected beams may include narrow beams and/or broad beams.

Data/information 1600 further includes an identified set of best narrow beams for UE 1 1618 including an identified best narrow beam for UE 1 1620, an identified set of best broad beams for UE 1 1622 including an identified best broad beam for UE 1 1624, an identified set of best narrow beams for UE 2 1626 including an identified best narrow beam for UE 2 1627, an identified set of best broad beams for UE 2 1628 including an identified best broad beam for UE 2 1630, . . . , an identified set of best narrow beams for UE Z 1632 including an identified best narrow beam for UE Z 1634, an identified set of best broad beams for UE Z 1636 including an identified best broad beam for UE Z 1638.

Data/information 1600 further includes a determined quality variance for the best narrow beam for UE 1 1640, a determined quality variance for the best broad beam for UE 1 1642, a determined quality variance for the best narrow beam for UE 2 1644, a determined quality variance for the best broad beam for UE 2 1646, a determined quality variance for the best narrow beam for UE Z 1648, a determined quality variance for the best broad beam for UE Z 1650.

Data/information 1600 further includes a determined quality indicator value, e.g., a mean quality value, for the best narrow beam for UE 1 1652, a determined quality indicator value, e.g., a mean quality value, for the best broad beam for UE 1 1654, a determined quality indicator value, e.g., a mean quality value, for the best narrow beam for UE 2 1656, a determined quality indicator value, e.g., a mean quality value, for the best broad beam for UE 2 1658, . . . , a determined quality indicator value, e.g., a mean quality value, for the best narrow beam for UE Z 1660, a determined quality indicator value, e.g., a mean quality value, for the best broad beam for UE Z 1662.

Data information 1600 further includes a first threshold 1664, e.g., first threshold of step 1420 or threshold_1 of step 1206, a second threshold 1666, e.g., second threshold of step 1428 or threshold_2 of step 1210, and a third threshold 1668, e.g., third threshold of step 1432 or threshold_3 of step 1214.

Data/information 1600 further includes a determined preferred beam mode for UE 1 1670, a determined preferred beam for UE 1 1672, a determined preferred beam mode for UE 2 1674, a determined preferred beam for UE 2 1676, . . . , a determined preferred beam mode for UE Z 1678, and a determined preferred beam for UE Z 1680.

Data/information 1600 further includes data to be transmitted to UE 1 1681, data to be transmitted to UE 2 1682, . . . , data to be transmitted to UE Z 1683, traffic requirements for traffic to be transmitted to UE 1 1684, an amount of data to be transmitted to UE 1 1685, traffic requirements for traffic to be transmitted to UE 2 1686, an amount of data to be transmitted to UE 2 1687, . . . , traffic requirements for traffic to be transmitted to UE Z 1688, and an amount of data to be transmitted to UE Z 1689.

Data/information 1600 further includes information identifying candidate broad beams covering an area corresponding to multiple UE devices 1690. Data/information 1600 further includes a determined preferred beam mode for UE 1 following a potential modification decision 1691, a determined preferred beam for UE 1 following a potential modification decision 1692, a determined preferred beam mode for UE 2 following a potential modification decision 1693, a determined preferred beam for UE 2 following a potential modification decision 1694, . . . , a determined preferred beam mode for UE Z following a potential modification decision 1695, and a determined preferred beam for UE Z following a potential modification decision 1696. Data/information 1600 further includes a list of beams to be used for transmission of traffic data to UEs 1697, and one or more generated beam signals, e.g., each generated beam communicating traffic data to one or more UEs, (generated beam 1 signals 1698, . . . , generated beam M signals 1699).

In some embodiments, data/information 1600 includes received beam mode request signals (received beam mode request signal from UE 1 1631 including a received requested beam mode indicator for UE 1 1633, received beam mode request signal from UE 2 1637 including a received requested beam mode indicator for UE 2 1639, . . . , received beam mode request signal from UE Z 1643 including a received requested beam mode indicator for UE Z 1645. In some such embodiments, data/information 1600 includes a UE 1 requested beam mode for UE 1 1635, a UE 2 requested beam mode for UE 2 1641, . . . , a UE Z requested beam mode for UE Z 1647. In some such embodiments, a requested beam mode is one of a broad beam mode or a narrow beam mode, e.g., with a UE basing its requested beam mode on UE applications and/or QoS needs of the UE.

Figure 17:
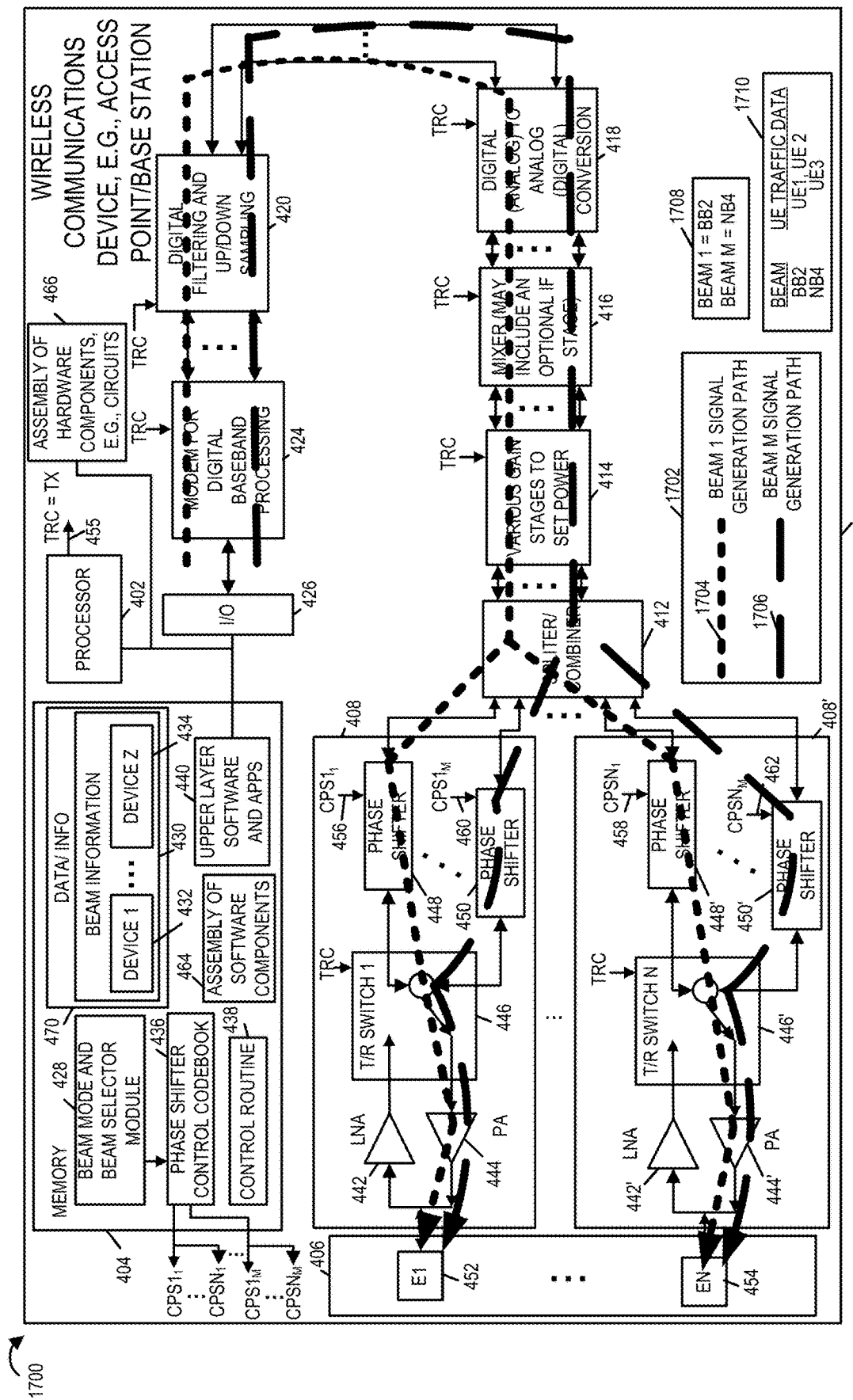
FIG. 17 is a drawing illustrating an example in which wireless communications device implemented in accordance with various features of the present invention, e.g., an access point, supporting beam forming management in accordance with the present invention and including a multi-element antenna array, is in transmit mode and is transmitting traffic data on a selected broad beam to two UEs and is transmitting traffic data to a third UE on a selected narrow beam.

FIG. 17 is a drawing 1700 illustrating an example in which wireless communications device 400, e.g., AP 400, is in transmit mode as indicated by TRC signal 455=TX. Legend 1702 indicates that bold dotted line arrow 1704 indicates a beam 1 signal generation path, and bold dashed line 1706 indicates a beam M signal generation path. Table 1708 indicates that selected beam 1 is a broad beam designated BB2 and that selected beam M is a narrow beam designated NB4. Table 1710 indicates that AP 400 transmits traffic data to UE 1 and UE 2 on BB2, and that AP 400 transmits traffic data to UE 3 on NB4. In one embodiment, AP 400 is AP 502 of FIG. 10, UE 1 is UE 1 506 of FIG. 10; UE 2 is UE 2 508 of FIG. 10, and UE 3 is UE 3 510 of FIG. 10, and the beams have been selected by AP 400 in accordance with the method of FIGS. 10, 11 and 12 and/or FIG. 14.

Various aspects and/or features of some embodiments of the invention are described below. In millimeter wave systems, higher transmit power is accomplished by a combination of the power output from the power amplifier and coherent combining in 'space' by an antenna array (also called array gain). As an example: say the output power from a single power amplifier is 10 dBm and there are 256 elements in the antenna array, each element being attached to one PA. Then the total PA power is 10 dBm+10*log 10(256)=34 dBm. In addition, the antenna array will provide an 'spatial combining' or array gain of 10*log 10(256)=24 dB in the peak direction. Total effective isotropic radiated power (eirp) becomes 58 dBm. Usually, each antenna element (like a microstrip patch) would provide additional spatial gain, called element gain, whose maximum value would typically be around 5 dB. So the total output power (eirp) is viewed as 34+24+5=63 dBm.

A consequence of achieving this high output power via array gain is that the beam width over which energy is radiated is fairly narrow (unlike sub-6 GHz systems, where the beams are very wide). An approximate measure of half-power beam width is 2 divided by the number of elements, in radians. So, a 256 element array, organized as a 32×8 array will have a beamwidth of 2/32=1/16th of a radian=3.6 degrees.

Such a narrow beam width makes the system quite sensitive to dynamics in the environment and latency between best-beam measurement, reporting and application. Similarly, any kind of obstacle that blocks the narrow beam could result in complete signal loss.

A system that allows using a broadened beam, lower eirp, for robustness when needed and a narrow beam, higher eirp when needed is therefore, highly advantageous. This can realistically be feasible when the power per PA is higher so that there is less reliance on the array gain and consequently, the narrow beam to achieve high output power.

A novel feature of various embodiments of the present invention includes broadening the data channel. Various aspects and/or features of some embodiments of the present invention are described below which relate to beam broadening for data channels. Various embodiments may include one, more or all of the features discussed below.

An exemplary communication system includes broadened and non-broadened code books, e.g., a broad beam code book and a narrow beam code book. In some embodiments, the broad beam code book and the narrow beam code book is included in a single code book.

The user is notified that broadened and non-broadened beams, e.g., broad beams and narrow beams, are available at the base station.

Best/ordered set broadened beam(s) and best non-broadened beam for each user is determined via beam sweep. This can be, and in some embodiments is, done hierarchically with a broadened beam sweep and then doing a non-broadened beam sweep only 'within' the broadened beam.

The base station receives indication from the UE on groups of broadened and non-broadened beams that may be received by the same UE receive sub-array or beam. This will allow the base station to dynamically schedule the UE on either the broadened or non-broadened beam without informing the UE explicitly in advance.

Exemplary conditions which may, and sometimes do, trigger the base station to broaden the beam:
i) Excess Signal-to-Noise Ratio (SNR). The base station may, and sometimes does, adapt the modulation and coding schemes (MCS) accordingly if the broadening has reduced the SNR;
ii) High mobility of the user (can be, and sometimes is, determined by rate of beam changes);
iii) User in a high blocking/shadowing environment (can be, and sometimes is, determined by sudden jumps in reported channel quality indicator/Signal to Noise Ratio (CQI/SNR) by the user). This can be, and sometimes is, partly based on historical information;
iv) Need for multiplexing more than one user in a beam—e.g., due to time+freq resource granularity being coarse;
v) Small amount of data to send (e.g. signaling data) or data that needs more robustness;
vi) Reduce interference variation caused to a neighbor cell. UE reports Reference Signal Received Power (RSRP) and Reference Signal Received Quality (RSRQ). If the base station finds that the RSRP is steady but RSRQ fluctuates a lot, it can ascertain that interference variations are strong and can, and sometimes does, request neighbor cells to broaden beams (as one example);
vii) Exploit additional multipath addressable by a single broadened beam to provide robustness to blockage. Advantage is that a single panel at the base station, e.g. gNodeB (gNB), gets used rather than multiple panels if the same functionality needs to be achieved with narrow beams;
viii) In connected Discontinuous Reception (cDRX) mode to allow the UE to sleep more effectively;
ix) Offer broadened beams for the purpose of tracking time/freq (e.g. Tracking Reference Signal (TRS) signal used in 5G New Radio (NR)) because maximum SNR is not needed in that case; and/or
x) Broaden beam for TRS so that multiple users can use the same TRS.

Similarly, the UE may, and in some embodiments, does also trigger broadening the beam if it finds that:
i) Beam changes are frequent;
ii) Substantial degradation occurs before the beam change is executed;
iii) For event based beam change request triggers, if the UE finds that it is having to transmit too many uplink messages, thus increasing active power consumption; and/or
iv) UE can request beam broadening from the gNB.

Indication from gNB that it is using a broadened beam. In the event when the UE has different sub-arrays picking up energy from different clusters and the gNB broadened beam can excite those different clusters, it's important for the UE to receive beamform accordingly.

Receive side broadened beamforming can also be done, and in some embodiments is done, at the gNB to receive from multiple users simultaneously in Frequency Division Multiplexing (FDM) fashion. This can be, and sometimes is, done to reduce packet latency.

One more or all of the above features can and sometimes are extended to multibeam wherein the beam broadening results in more than one discernable beam (larger angular separation than just broadening).

Various embodiments, in accordance with the present invention are directed to method and apparatus of beam management.

Having described some features found in one or more embodiments, various numbered exemplary embodiments will be discussed.

Numbered List of Exemplary Method Embodiments

Method Embodiment 1 A method of operating a first communications device, the method comprising: receiving, from a second communications device, signal quality information for a first period of time corresponding to beams transmitted by the first communications device; identifying a set of X broad beams having the best reported quality, said set of X beams including one or more broad beams; identifying a set of Y narrow beams having the best reported quality, said set of Y beams including one or more narrow beams; determining a first quality variance for the best Y beam for the first period of time (in some embodiments determine quality variance for each beam in Y set of beams); and determining a preferred beam mode based on at least the first quality variance, said preferred beam mode being one of a broad beam mode or a narrow beam mode.

Method embodiment 1A. The method of Method Embodiment 1, further comprising: transmitting (1448), using a beam corresponding to the preferred beam mode, data to the second communications device.

Method Embodiment 2 The method of Method Embodiment 1, further comprising: transmitting, using a beam corresponding to the preferred beam mode, data to the second communications device.

Method Embodiment 3 The method of Method Embodiment 1, wherein determining the preferred beam mode includes: determining if the first quality variance (best Y narrow beam quality variance) is greater than a first threshold; and setting the preferred beam mode to narrow beam mode when it is determined that the first quality variance is not greater than (i.e., is less than) the first threshold (if variance in best narrow beam is small its reliable and thus will be used, if the preferred beam decision is not overruled, to support simultaneous (fdm) transmissions to multiple devices). In some embodiments the first quality variance is measured based on the number of beam changes that happen within the narrow beam mode. For example if the UE is constantly changing the beam in the narrow beam mode, that could also be considered a first quality variance.

Method Embodiment 4 The method of Method Embodiment 3, where said first quality variance is for a time period of 5 milliseconds or less (and in some embodiments 1 millisecond or less) (in millimeter wavelength communications there may be 8 transmission slots per millisecond).

Method Embodiment 5 The method of Method Embodiment 3, when it is determined that the first quality variance is greater than the first threshold said step determining a preferred beam mode is further based on: i) a first quality indicator value for the best beam in said set of Y narrow beams (e.g., average or mean quality value for best of Y narrow beams), said first quality indicator value generated from multiple reported signal quality values, corresponding to the best Y beam, included in said received signal quality information; and ii) a second quality indicator value for the best beam in said set of X broad beams (e.g., average or mean quality value for best of X broad beams), said second quality indicator value generated from multiple reported signal quality values, corresponding to the best X beam, included in said received signal quality information.

Method Embodiment 6 The method of Method Embodiment 5, further comprising when it is determined that the first quality variance is greater than the first threshold, determining a difference between the first quality indicator value (Y narrow beam) and the second quality indicator value (X broad); determining if the difference is below a second threshold; and setting the preferred beam mode to narrow beam mode when it is determined that difference is not below the second threshold.

Method Embodiment 7 The method of Method Embodiment 6, further comprising; when said difference is below the second threshold, determining if the quality variance of the best beam in the set of X broad beams is below a third threshold; and in response to determining that the quality variance of the best beam in the set of X broad beams is below the third threshold setting the preferred beam mode to broad beam mode; and otherwise setting the preferred beam mode to narrow beam mode.

Method Embodiment 8 The method of Method Embodiment 3, further comprising, prior to transmitting, using the beam corresponding to the preferred beam mode, data to the second communications device, making a decision whether or not to modify the preferred beam mode, the method comprising: determining if there is a broad beam covering an area in which the second communications device is located and a third communications device is located, said broad beam covering said area being a candidate beam (e.g., determine if there is a candidate beam in the set of supported broad beams which covers an area in which the second device and another device are located to see if simultaneous transmission to both devices can be supported using the candidate broad beam); if it is determined that there is no broad beam covering an area in which the second communications device is located and a third communications device is located leaving the preferred beam mode and beam unchanged; and if it is determined that there is a broad beam covering an area in which the second communications device is located and a third communications device is located, the method further comprising: making a decision as to whether to set the beam mode to broad beam mode and the preferred beam to the candidate beam based on one or more of: i) traffic requirements for traffic to be transmitted to at least one of the second and third communications devices; ii) the amount of data to be transmitted to the third communications device and iii) the amount of data to be transmitted to the second communications device. It should be appreciated that the coverage area may be and sometimes is affected by reflections or obstructions and that two devices may be close, if one receives a reflected signal from a beam and the other a direct signal, even though they are not physically that close.

Method Embodiment 9 The method of Method Embodiment 8, wherein making the decision as to whether to set the beam mode to broad beam mode and the preferred beam to the candidate beam includes: deciding to set the beam mode to broad beam mode and the preferred beam to the candidate beam based on one or more of: traffic requirements (QOS such as latency) for traffic to be transmitted to at least one of the second and third communications devices; ii) the amount of data to be transmitted to the third communications device and iii) the amount of data to be transmitted to the second communications device.

Method Embodiment 10 The method of Method Embodiment 1, further comprising: receiving from the second communications device a request for a particular beam mode, said requested beam mode being one of a broad beam mode or a narrow beam mode; and determining if the preferred beam mode indicates a beam mode which is different from the requested beam mode; changing the preferred beam mode to the requested beam mode when the use of a beam corresponding to the requested beam mode will satisfy power or QoS requirements of the second communications device.

Method Embodiment 11 The method of Method Embodiment 10, wherein, receiving from the second communications device a request for a particular beam mode includes: receiving from the second communications device a requested beam mode indicator indicating one of a broad beam mode and a narrow beam mode.

Numbered List of Exemplary Apparatus Embodiments

Apparatus Embodiment 1 A first communications device (400), comprising: an antenna array (406) including antenna elements (452, 454); receiver circuitry (442, 442') coupled to said antenna elements (452, 454), said receiver circuitry (442, 442') being configured to receive, signal quality information from a second communications device, for a first period of time corresponding to beams transmitted by the first communications device; a processor (402) configured to: i) identify a set of X broad beams having the best reported quality, said set of X beams including one or more broad beams; ii) identify a set of Y narrow beams having the best reported quality, said set of Y beams including one or more narrow beams; iii) determine a first quality variance for the best Y beam for the first period of time (in some embodiments determine quality variance for each beam in Y set of beams); and iv) determine a preferred beam mode based on at least the first quality variance, said preferred beam mode being one of a broad beam mode or a narrow beam mode; and transmitter circuitry (444, 444') coupled to said antenna elements (452, 454), said transmitter circuitry (444, 444') configured to transmit information indicating the preferred beam mode and beam to the second communications device.

Apparatus Embodiment 2 The first communications device (400) of Apparatus Embodiment 1, wherein the processor is configured, as part of determining the preferred beam mode to: determine if the first quality variance (best Y narrow beam quality variance) is greater than a first threshold; and set the preferred beam mode to narrow beam mode when it is determined that the first quality variance is not greater than (i.e., is less than) the first threshold (if variance in best narrow beam is small its reliable and thus will be used, if the preferred beam decision is not overruled, to support simultaneous (frequency division multiplexing (fdm)) transmissions to multiple devices).

Apparatus Embodiment 3 The first communications device (400) of Apparatus Embodiment 2, where said first quality variance is for a time period of 5 milliseconds or less (and in some embodiments 1 millisecond or less) (in millimeter wavelength communications there may be 8 transmission slots per millisecond).

Apparatus Embodiment 4 The first communications device (400) of Apparatus Embodiment 2, when it is determined that the first quality variance is greater than the first threshold said step determining a preferred beam mode is further based on: i) a first quality indicator value for the best beam in said set of Y narrow beams (e.g., average or mean quality value for best of Y narrow beams), said first quality indicator value generated from multiple reported signal quality values, corresponding to the best y beam, included in said received signal quality information; and ii) a second quality indicator value for the best beam in said set of X broad beams (e.g., average or mean quality value for best of X broad beams), said second quality indicator value generated from multiple reported signal quality values, corresponding to the best X beam, included in said received signal quality information.

Apparatus Embodiment 5 The first communications device (400) of Apparatus Embodiment 4, wherein the processor (402) is further configured, when it is determined that the first quality variance is greater than the first threshold, to: determine a difference between the first quality indicator value (Y narrow beam) and the second quality indicator value (X broad beam); determine if the difference is below a second threshold; and set the preferred beam mode to narrow beam mode when it is determined that difference is not below the second threshold.

Apparatus Embodiment 6 The first communications device (400) of Apparatus Embodiment 5, wherein the processor (402) is further configured, when it is determined that the first quality variance is greater than the first threshold and below the second threshold, to: determine if the quality variance of the best beam in the set of X broad beams is below a third threshold; and in response to determining that the quality variance of the best beam in the set of X broad beams is below the third threshold setting the preferred beam mode to broad beam mode; and otherwise setting the preferred beam mode to narrow beam mode.

Apparatus Embodiment 7 The first communications device (400) of Apparatus Embodiment 2, wherein the processor is further configured to, prior to transmission of the preferred beam mode to the second device: make a decision whether or not to modify the preferred beam mode prior to transmitting of the preferred beam mode to the second communications device, said making of a decision including: determining if there is a broad beam covering an area in which the second communications device is located and a third communications device is located, said broad beam covering said area being a candidate beam (e.g., determine if there is a candidate beam in the set of supported broad beams which covers an area in which the second device and another device is located to see if simultaneous transmission to both devices can be supported using the candidate broad beam); if it is determined that there is no broad beam covering an area in which the second communications device is located and a third communications device is located leaving the preferred beam mode and beam unchanged; and if it is determined that there is a broad beam covering an area in which the second communications device is located and a third communications device is located, the method further comprising: making a decision as to whether to set the beam mode to broad beam mode and the preferred beam to the candidate beam based on one or more of: i) traffic requirements for traffic to be transmitted to at least one of the second and third communications devices; ii) the amount of data to be transmitted to the third communications device and iii) the amount of data to be transmitted to the second communications device.

Apparatus Embodiment 8 The first communications device (400) of Apparatus Embodiment 7, wherein making the decision as to whether to set the beam mode to broad beam mode and the preferred beam to the candidate beam includes: deciding to set the beam mode to broad beam mode and the preferred beam to the candidate beam based on one or more of traffic requirements (QOS such as latency) for traffic to be transmitted to at least one of the second and third communications devices; ii) the amount of data to be transmitted to the third communications device and iii) the amount of data to be transmitted to the second communications device.

Apparatus Embodiment 9 The first communications device (400) of Apparatus Embodiment 1, wherein said receiver circuitry (442, 442') is further configured to receive from the second communications device a request for a particular beam mode, said requested beam mode being one of a broad beam mode or a narrow beam mode; and wherein the processor (402) is further configured to: determine if the preferred beam mode indicates a beam mode which is different from the requested beam mode; and change the preferred beam mode to the requested beam mode when the use of a beam corresponding to the requested beam mode will satisfy power or QoS requirements of the second communications device.

Apparatus Embodiment 10 The first communications device (400) of Apparatus Embodiment 9, wherein said receiver circuitry (442, 442') is further configured to receive from the second communications device a requested beam mode indicator indicating one of a broad beam mode and a narrow beam mode, as part of being configured to receive from the second communications device a request for a particular beam mode.

Number List of Exemplary Computer Readable Medium Embodiments

Computer Readable Medium Embodiment 1 A computer readable medium including processor executable instructions which when executed by a processor in a first communications device, control the first communications device to: receive (1404), from a second communications device, signal quality information for a first period of time corresponding to beams transmitted by the first communications device; identify (1406) a set of X broad beams having the best reported quality, said set of X beams including one or more broad beams; identify (1408) a set of Y narrow beams having the best reported quality, said set of Y beams including one or more narrow beams; determine (1412) a first quality variance for the best Y beam for the first period of time (in some embodiments determine quality variance for each beam in Y set of beams); and determine (1419) a preferred beam mode based on at least the first quality variance, said preferred beam mode being one of a broad beam mode or a narrow beam mode.

While features used in some but not all embodiments have been described in terms of altering an initial preferred narrow beam selection to a broad beam mode of operation and broad beam selection, the methods can be used to choose a different narrow beam than the beam initially selected as a preferred beam when a narrow mode of communication is to be used and/or selecting a beam other than the beam with the best channel quality to a device when a broad beam mode of operation is determined to be used. From the perspective of an individual device this may appear as a suboptimal selection of a beam mode and/or beam from an overall system throughput or QoS perspective it can be desirable since the needs of multiple devices may be satisfied by the switch in beam mode and/or beam selection.

In the present application base stations are to be understood as including access points while wireless terminals will be used to refer to devices which interact with base stations, e.g., UE devices which interact with access points, e.g., WiFi STAs (stations). Wireless terminals such as UEs can be, for example, cell phones, tablets, mobile or stationary customer premises equipment. A communications device can be either base stations or wireless terminals.

The techniques of various embodiments may be implemented using software, hardware and/or a combination of software and hardware. Various embodiments are directed to apparatus and/or systems, e.g., wireless communications systems, wireless terminals, user equipment (UE) devices, access points, e.g., a WiFi wireless access point, a cellular wireless AP, e.g., an eNB or gNB, user equipment (UE) devices, a wireless cellular systems, e.g., a cellular system, WiFi networks, etc. Various embodiments are also directed to methods, e.g., method of controlling and/or operating a system or device, e.g., a communications system, an access point, a base station, a wireless terminal, a UE device, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments nodes and/or elements described herein are implemented using one or more components to perform the steps corresponding to one or more methods, for example, controlling, establishing, generating a message, message reception, signal processing, sending, communicating, e.g., receiving and transmitting, comparing, making a decision, selecting, making a determination, modifying, controlling determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless communications device including a multi-element antenna array supporting beam forming, such as a cellular AP or Wifi AP, a wireless terminal, a UE device, etc., including a processor configured to implement one, multiple or all of the steps of one or more methods of the invention.

In some embodiments, the processor or processors, e.g., CPUs, of one or more devices, are configured to perform the steps of the methods described as being performed by the devices, e.g., communication nodes. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., access point, with a processor which includes a component corresponding to each of the steps of the various described methods performed by the device in which the processor is included. In some but not all embodiments a device, e.g., wireless communications node such as an access point or base station, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a wireless communications device such as an access point. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a wireless communications device such as an access point described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first communications device, the method comprising;
   receiving, from a second communications device, signal quality information for a first period of time corresponding to beams transmitted by the first communications device;
   identifying a set of Y narrow beams having the best reported quality, said set of Y beams including one or more narrow beams;
   determining a first quality variance for the best Y narrow beam for the first period of time, said first quality variance being based on beam channel quality and said determined quality variance being a channel quality variance for the best Y narrow beam; and
   determining a preferred beam mode based on at least the first quality variance, said preferred beam mode being one of a broad beam mode or a narrow beam mode, said step of determining the preferred beam mode including:
      determining if the first quality variance is greater than a first threshold; and
      setting the preferred beam mode to narrow beam mode when it is determined that the first quality variance is not greater than the first threshold.

2. The method of claim 1, where said first quality variance is for a time period of 5 milliseconds or less.

3. The method of claim 1, further comprising:
   making a decision whether or not to modify the preferred beam mode, prior to transmitting, using a beam corresponding to the preferred beam mode, data to the second communications device.

4. A method of operating a first communications device, the method comprising:
- receiving, from a second communications device, signal quality information for a first period of time corresponding to beams transmitted by the first communications device;
- identifying a set of Y narrow beams having the best reported quality, said set of Y beams including one or more narrow beams;
- determining a first quality variance for the best Y narrow beam for the first period of time;
- determining a preferred beam mode based on at least the first quality variance, said preferred beam mode being one of a broad beam mode or a narrow beam mode, said step of determining the preferred beam mode includes:
  - i) determining if the first quality variance is greater than a first threshold; and
  - ii) setting the preferred beam mode to narrow beam mode when it is determined that the first quality variance is not greater than the first threshold; and
- wherein the method further includes:
  - determining if there is a broad beam covering an area in which the second communications device is located and a third communications device is located, said broad beam covering said area being a candidate beam; and
  - if it is determined that there is no broad beam covering an area in which the second communications device is located and a third communications device is located leaving the preferred beam mode unchanged.

5. The method of claim 4, further comprising:
- making, in response to determining that there is a broad beam covering an area in which the second communications device is located and a third communications device is located, a decision as to whether to set the beam mode to broad beam mode and the preferred beam to the candidate beam based on one or more of: i) traffic requirements for traffic to be transmitted to at least one of the second and third communications devices; ii) the amount of data to be transmitted to the third communications device and iii) the amount of data to be transmitted to the second communications device.

6. The method of claim 5, wherein making the decision as to whether to set the beam mode to broad beam mode and the preferred beam to the candidate beam includes:
- deciding to set the beam mode to broad beam mode and the preferred beam to the candidate beam based on one or more of: traffic requirements for traffic to be transmitted to at least one of the second and third communications devices; ii) the amount of data to be transmitted to the third communications device and iii) the amount of data to be transmitted to the second communications device.

7. The method of claim 1, further comprising:
- receiving from the second communications device a request for a particular beam mode, said requested beam mode being one of a broad beam mode or a narrow beam mode.

8. The method of claim 7, further comprising:
- determining if the preferred beam mode indicates a beam mode which is different from the requested beam mode; and
- changing the preferred beam mode to the requested beam mode when the use of a beam corresponding to the requested beam mode will satisfy power or QoS requirements of the second communications device.

9. The method of claim 8, wherein, receiving from the second communications device a request for a particular beam mode includes:
- receiving from the second communications device a requested beam mode indicator indicating one of a broad beam mode and a narrow beam mode.

10. A first communications device, comprising:
- an antenna array including antenna elements;
- receiver circuitry coupled to said antenna elements, said receiver circuitry being configured to receive, signal quality information from a second communications device, for a first period of time corresponding to beams transmitted by the first communications device;
- a processor configured to:
  - i) identify a set of Y narrow beams having the best reported quality, said set of Y narrow beams including one or more narrow beams;
  - ii) determine a first quality variance for the best Y narrow beam for the first period of time, said first quality variance being based on beam channel quality and said determined quality variance being a channel quality variance for the best Y narrow beam; and
  - iii) determine a preferred beam mode based on at least the first quality variance, said preferred beam mode being one of a broad beam mode or a narrow beam mode, wherein the processor is configured, as part of determining the preferred beam mode to:
    - determine if the first quality variance is greater than a first threshold; and
    - set the preferred beam mode to narrow beam mode when it is determined that the first quality variance is not greater than the first threshold; and
- transmitter circuitry coupled to said antenna elements, said transmitter circuitry configured to transmit information indicating the preferred beam mode and beam to the second communications device.

11. The first communications device of claim 10, where said first quality variance is for a time period of 5 milliseconds or less.

12. The first communications device of claim 10, wherein the processor is further configured to:
- make a decision whether or not to modify the preferred beam mode prior to transmitting of a preferred beam mode to the second communications device.

13. A first communications device, comprising:
- an antenna array including antenna elements;
- receiver circuitry coupled to said antenna elements, said receiver circuitry being configured to receive, signal quality information from a second communications device, for a first period of time corresponding to beams transmitted by the first communications device;
- a processor configured to:
  - i) identify a set of Y narrow beams having the best reported quality, said set of Y narrow beams including one or more narrow beams;
  - ii) determine a first quality variance for the best Y narrow beam for the first period of time; and
  - iii) determine a preferred beam mode based on at least the first quality variance, said preferred beam mode being one of a broad beam mode or a narrow beam mode; and
- transmitter circuitry coupled to said antenna elements, said transmitter circuitry configured to transmit information indicating the preferred beam mode and beam to the second communications device;

wherein the processor is configured, as part of part of being configured to determine the preferred beam mode, to:
  determine if the first quality variance is greater than a first threshold; and
  set the preferred beam mode to narrow beam mode when it is determined that the first quality variance is not greater than the first threshold; and
wherein the processor is further configured to:
  determine, prior to transmitting of the preferred beam mode to the second communications device, if there is a broad beam covering an area in which the second communications device is located and a third communications device is located, said broad beam covering said area being a candidate beam.

14. The first communications device of claim 13, wherein the processor is further configured to control the first communications device to:
  leave the preferred beam mode unchanged when it is determined that there is no broad beam covering an area in which the second communications device is located and a third communications device is located.

15. The method of claim 14, wherein the processor is further configured to control the first communications device to:
  make a decision as to whether to set the beam mode to broad beam mode and the preferred beam to the candidate beam based on one or more of: i) traffic requirements for traffic to be transmitted to at least one of the second and third communications devices; ii) the amount of data to be transmitted to the third communications device and iii) the amount of data to be transmitted to the second communications device, when it is determined that there is a broad beam covering an area in which the second communications device is located and a third communications device is located.

16. The first communications device of claim 15, wherein making the decision as to whether to set the beam mode to broad beam mode and the preferred beam to the candidate beam includes:
  deciding to set the beam mode to broad beam mode and the preferred beam to the candidate beam based on one or more of: traffic requirements for traffic to be transmitted to at least one of the second and third communications devices; ii) the amount of data to be transmitted to the third communications device and iii) the amount of data to be transmitted to the second communications device.

17. The first communications device of claim 11,
wherein said receiver circuitry is further configured to receive from the second communications device a request for a particular beam mode, said requested beam mode being one of a broad beam mode or a narrow beam mode; and
wherein the processor is further configured to:
  determine if the preferred beam mode indicates a beam mode which is different from the requested beam mode; and
  change the preferred beam mode to the requested beam mode when the use of a beam corresponding to the requested beam mode will satisfy power or QoS requirements of the second communications device.

18. A non-transitory computer readable medium including processor executable instructions which when executed by a processor in a first communications device, control the first communications device to:
  receive, from a second communications device, signal quality information for a first period of time corresponding to beams transmitted by the first communications device;
  identify a set of X broad beams having the best reported quality, said set of X broad beams including one or more broad beams;
  identify a set of Y narrow beams having the best reported quality, said set of Y narrow beams including one or more narrow beams;
  determine a first quality variance for the best Y narrow beam for the first period of time, said first quality variance being based on beam channel quality and said determined quality variance being a channel quality variance for the best Y narrow beam; and
  determine a preferred beam mode based on at least the first quality variance, said preferred beam mode being one of a broad beam mode or a narrow beam mode, wherein as part of being controlled to determine the preferred beam mode the first communications device is controlled to:
    determine if the first quality variance is greater than a first threshold; and
    set the preferred beam mode to narrow beam mode when it is determined that the first quality variance is not greater than the first threshold.

* * * * *